US012165089B1

(12) United States Patent
Perrotta, Jr. et al.

(10) Patent No.: US 12,165,089 B1
(45) Date of Patent: Dec. 10, 2024

(54) REMOTE VIRTUAL MANAGEMENT SYSTEM

(71) Applicants: Frank Perrotta, Jr., East Granby, CT (US); Joel Vande Boom, New Albany, OH (US)

(72) Inventors: Frank Perrotta, Jr., East Granby, CT (US); Joel Vande Boom, New Albany, OH (US)

(73) Assignee: Inicio Solutions LLC, New Albany, OH (US)

( * ) Notice: Subject to any disclaimer, the term of this patent is extended or adjusted under 35 U.S.C. 154(b) by 191 days.

(21) Appl. No.: 17/540,093

(22) Filed: Dec. 1, 2021

Related U.S. Application Data

(60) Provisional application No. 63/120,088, filed on Dec. 1, 2020.

(51) Int. Cl.

| | |
|---|---|
| ***G06Q 10/0631*** | (2023.01) |
| ***G06F 3/04815*** | (2022.01) |
| ***G06Q 50/04*** | (2012.01) |
| ***G06Q 50/163*** | (2024.01) |

(52) U.S. Cl.
CPC . *G06Q 10/063114* (2013.01); *G06F 3/04815* (2013.01); *G06Q 50/04* (2013.01); *G06Q 50/163* (2013.01)

(58) Field of Classification Search
CPC ..... G06F 16/3329; G06F 16/35; G06N 20/00; G06N 20/10; G06N 20/20; G06N 3/044; G06N 3/045; G06N 3/047; G06N 3/08; G06N 3/084; G06N 3/088; G06N 5/01; G06N 5/025; G06N 7/01; G06Q 30/0201; G06Q 40/02
See application file for complete search history.

(56) References Cited

U.S. PATENT DOCUMENTS

| | | | | |
|---|---|---|---|---|
| 9,654,739 | B1 * | 5/2017 | Mitchell | H04N 23/62 |
| 10,572,801 | B2 * | 2/2020 | Mars | G06Q 30/0201 |
| 10,708,507 | B1 * | 7/2020 | Dawson | G06F 3/011 |
| 10,825,247 | B1 * | 11/2020 | Vincent | G06T 19/003 |
| 2016/0171525 | A1 * | 6/2016 | Ezra | G06Q 30/0225 705/14.12 |
| 2019/0369850 | A1 * | 12/2019 | Roy | H04L 41/22 |

* cited by examiner

*Primary Examiner* — Ming Wu
(74) *Attorney, Agent, or Firm* — Gordon Rees Scully & Mansukhani, LLP

(57) ABSTRACT

An asset management system providing a 3D virtual workspace to track, manage, and view assets of a business. The 3D virtual space is configured to provide a remote system and method to manage the assets. The asset management system also includes an AI system configured to aid the system by providing suggestions and automated decision making in the management system.

22 Claims, 18 Drawing Sheets

REMOTE VIRTUAL MANAGEMENT SYSTEM

CROSS REFERENCE TO RELATED APPLICATION

This application claims priority to and the benefit of U.S. Provisional Application No. 63/120,088, filed Dec. 1, 2020. The foregoing provisional application is incorporated by reference herein in its entirety.

GENERAL DESCRIPTION

The present disclosure relates to a management system, specifically an automated remote management system utilizing a new and unique virtual reality user interface. The system provides improved and efficient information gathering that improves the overall function of the related business. The system provides improved business intelligence regarding the operation of the business and, in particular, with regard to equipment, inventory, and other business assets. The system provides an assessment of the functioning of each asset in order to maximize returns on investment.

Currently, the functions related to managing facilities, real estate, equipment, and other assets related to property is done manually. As described herein, an "asset" may refer to a piece of equipment, all or part of a building (i.e., floor, roof, ceiling, etc.) or any other property of value requiring continuing observation and management. All data is gathered, recorded, and tracked manually. Given the large amount of property being managed by businesses, massive amounts of manpower are required to efficiently manage and maintain assets for the life of a property (e.g., 100 years including 1 year to build and 99 years to manage). Furthermore, items are frequently neglected or forgotten due to the large amounts of data being managed.

Typical problems the industry encounters are: high resource requirements for work orders and action items, lack of knowledge of assets (e.g., lack of model or lack of how the assets functions or performs over time), incomplete or inaccurate maintenance schedules, missing asset material information, inaccurate location of assets, inaccurate tracking of pending and required work orders for assets, complex and inefficient communication between area or property managers and facility repair managers, incomplete actions needed to complete or issue work orders for assets, inaccurate information of property details, lack of assistance with work order execution, inaccurate action items or work orders for assets, inaccurate inventory and poor tracking of assets throughout the property, and improper management of tasks within the facility repair team. Some owners, managers, or employees lack oversight of facility and equipment status. Some employees may even lack agency and/or incentives to handle commonly arising problems and issues. In the current digital world there remains a lack of remote solutions. Current solutions provide inefficient communication and time management. As a result of these problems, and many others, resources such as time and money are wasted.

The system described herein can be employed in, for example, restaurants, hotels, manufacturing facilities (e.g., factories), residential and/or office buildings and other properties including equipment and assets requiring observation and management.

As described herein, the disclosed management system provides an improved system that addresses many of the current issues of property and asset management. Specific features of the maintenance system will be described further below.

BRIEF DESCRIPTION OF THE DRAWINGS

The features, aspects, and advantages of the present disclosure will become apparent from the following description, and the accompanying exemplary embodiments shown in the drawings, which are briefly described below.

DETAILED DESCRIPTION

Figure 1:
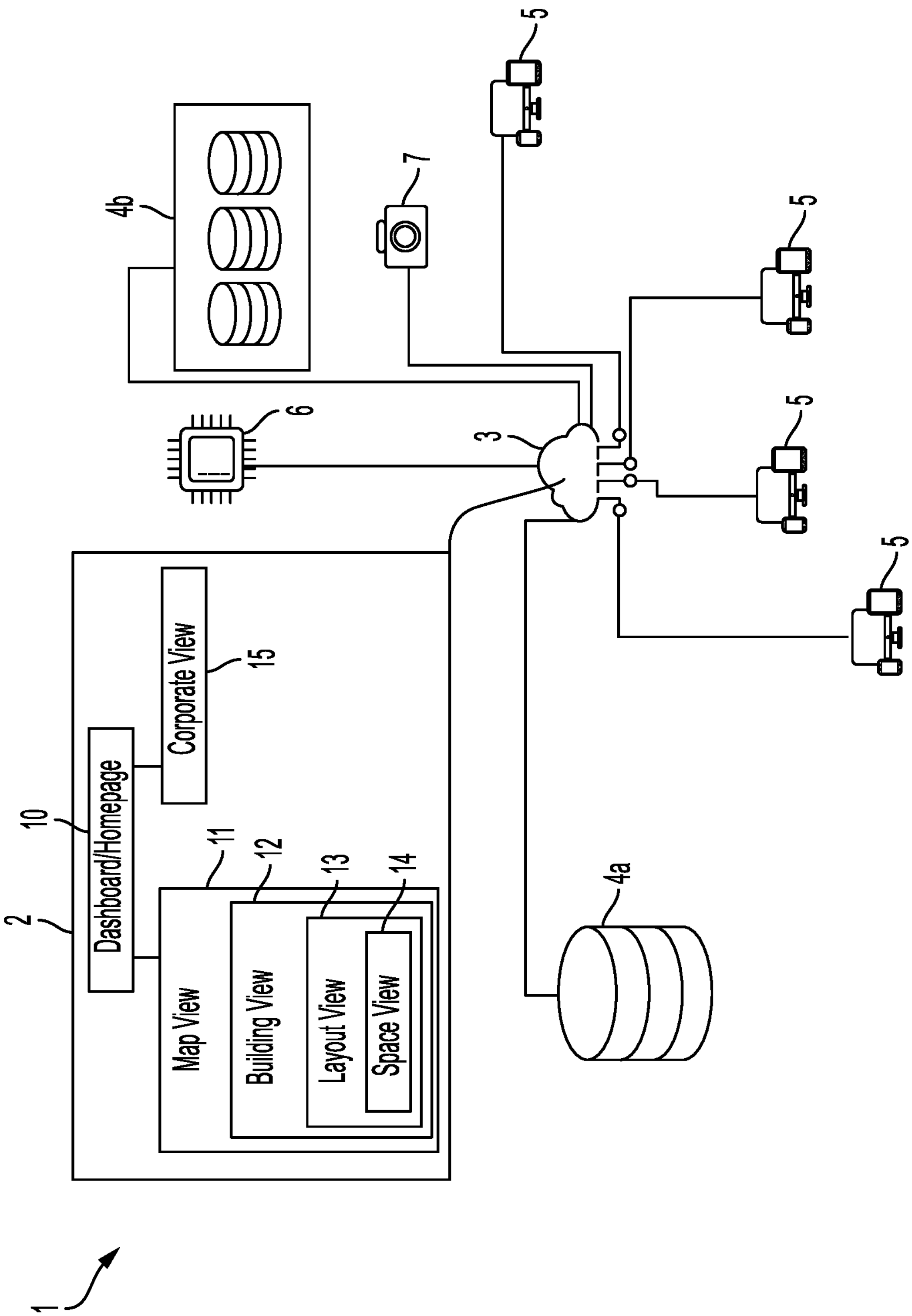
FIG. 1 is an exemplary embodiment of a remote virtual management system.

According to one embodiment, a management system for a plurality of assets located on a property, the management system comprising, a network, a virtual platform hosted on the network, wherein the network includes at least one processor, wherein the network is configured to accept a plurality of remote users connected to the network via a plurality of electronic devices, wherein the plurality of electronic devices are configured to communicate with the virtual platform. The virtual platform comprising a plurality of interactable layers, wherein at least one interactable layer is configured to be displayed on at least one of the plurality of electronic devices, wherein the at least one of the plurality of interactable layers includes a three-dimensional (3D) model representation of a region of the property, wherein the 3D model representation includes a plurality of interactable elements, wherein each of the plurality of interactable elements corresponds to one of the plurality of assets, wherein the processor is configured to display a graphical interface on the at least one of the electronics when one of plurality of users selects one of the plurality of interactable elements, and wherein the graphical interface includes a display of asset information of one of the plurality of assets corresponding to the one intractable element, wherein the processor is configured to receive capture data that includes images of the property and the plurality of assets, and wherein the processor reconfigures the data to create the interactable layer.

According to another embodiment, a work order system for a plurality of equipment located in a property, the work order system comprising, a network, a virtual platform hosted in the network, wherein the network includes at least one processor, wherein the network is configured to communicate to a plurality of remote users connected to the network via a plurality of electronic devices, wherein the plurality of electronic devices are configured to communicate with the virtual platform, wherein the virtual platform is configured to process a work order, via the processor, of at least one user of the plurality of remote users initiating the work order, wherein the work order is received by an external user, wherein the platform is configured to update the at least one user with a status of the work order, and wherein the status is updated by the external user, a data capturing system configured to update the virtual platform after the completion of the work order, wherein the data capturing system includes one optical sensor, the processor configured to receive capture data from the data capturing system, wherein the work order is associated with an equipment of the plurality of equipment.

According to one embodiment, a management system for a plurality of assets, the management system comprising, a network, a virtual platform hosted in the network, wherein the network is configured to communicate to a plurality of remote users connected to the network via a plurality of electronic devices, wherein the plurality of electronic devices are configured to communicate with the virtual platform, wherein the virtual platform is configured to be updated with update data via an artificial intelligence system, wherein the artificial intelligence system sends suggestions to the plurality of remote users, and wherein the plurality of remote users is configured to receive updates and suggestions in the virtual platform via the artificial intelligence.

A management system for machinery located in a manufacturing site, the work order system comprising, a network, a virtual platform hosted in the network. Wherein the network includes at least one processor. Wherein the network is configured to communicate to a plurality of remote users connected to the network via a plurality of electronic devices. Wherein the plurality of electronic devices are configured to communicate with the virtual platform, wherein the virtual platform is configured to process a work order, via the processor, of at least one user of the plurality of remote users initiating the work order, wherein the work order is received by an external user, wherein the platform is configured to update the at least one user with a status of the work order, and wherein the status is updated by the external user, a data capturing system configured to update the virtual platform after the completion of the work order, wherein the data capturing system includes one optical sensor, the processor configured to receive capture data from the data capturing system, wherein the work order is associated with an manufacturing equipment of the machinery.

FIG. 1 shows a management system 1 including a virtual platform 2. The virtual platform 2 serves many purposes. The management system may also include a processor 6 and a data capturing system 7. The management system may aid in many different functions in real estate such as managing leases, and owned spaces. Building operations can also be managed easily which can be critical for employees by providing comfortable working environments and minimizing operating expenses. The management system 1 may also manage assets within the property such as furniture or equipment. The management system 1 may also manage utilization of space to maximize function of employees.

Virtual platform 2 includes dashboard or homepage 10 that includes multiple application layers within the virtual platform represented as a user interface (UI). The different application elements may include a map view layer 11, a building view layer 12, layout view layer 13, and a space view layer 14, and corporate layer 145. The virtual platform 2 may be provided in a cloud network 3, webserver, or any other connected network system (e.g. Internet) configured to communicate to multiple electronic devices 5. One or more databases 4*a* is configured to store data associated with the management system and communicates with virtual platform 2 and/or electronic devices 5 via network 3. Electronic devices 5 may include laptops, mobile phones, personal computers, or any other interactable electronics capable of connecting to the network 3. Electronic devices 5 may also act as a hub for additional devices to connect to via any known wired or waveguided manner. One or more external database 4*a* may also be configured to communicate with the network 3 and virtual platform 2 in order to provide data from external entities (e.g. asset market price from vendors or suppliers, work order time estimations, etc.)

Figure 2:
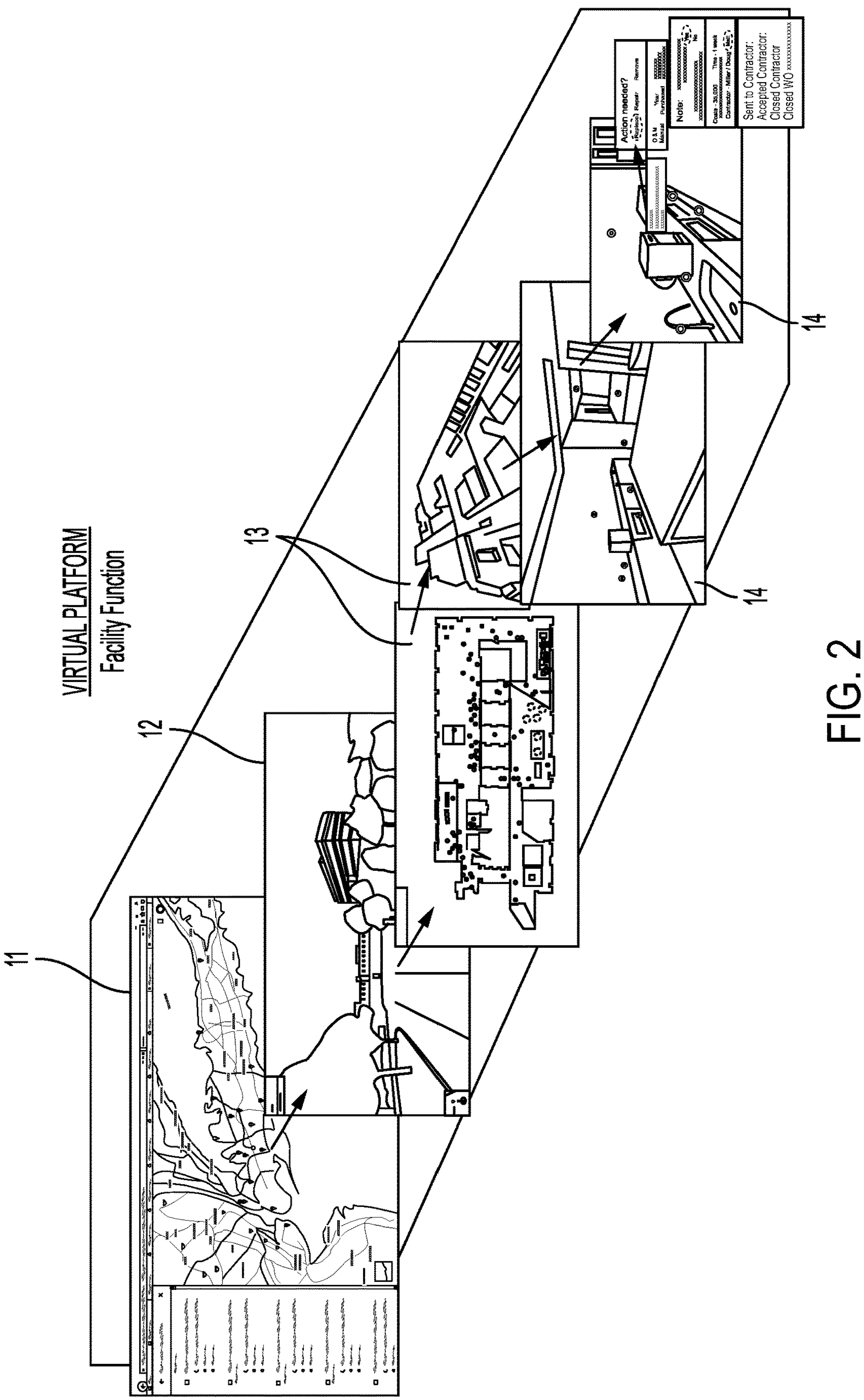
FIG. 2 is an exemplary embodiment of the virtual platform layers.

When one or more electronic devices 5 connects to the network 3, the virtual platform 2 and dashboard or homepage 10 may be displayed to the connected device. The device 5 may access different application layers via the dashboard 10. FIG. 2 shows an exemplary dashboard 10. The dashboard 10 may include a dashboard user interface configured to be interactable with interactable elements. A user may utilize the device 5 in order to perform actions via virtual platform 2

Figure 3:
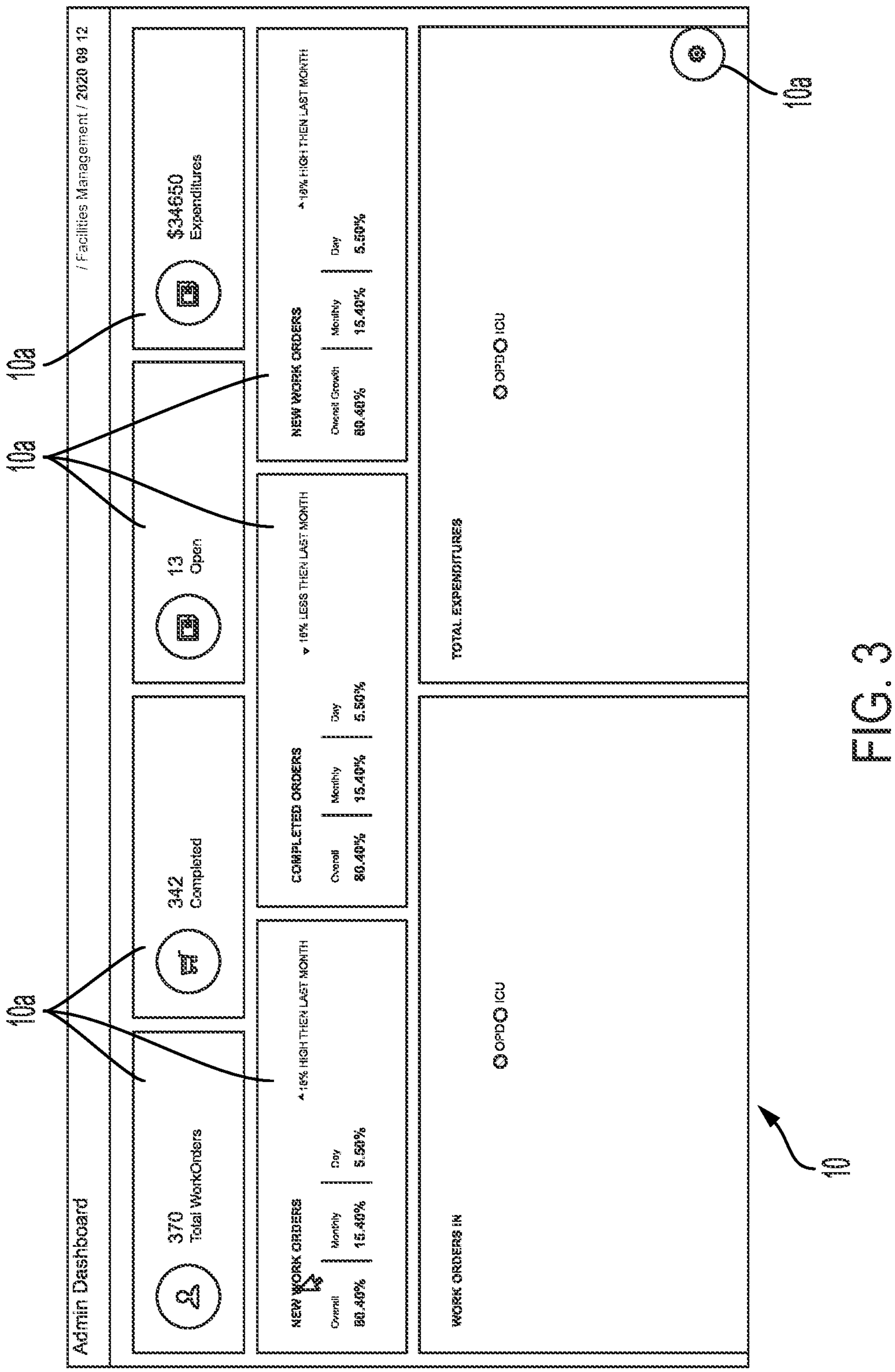
FIG. 3 is an exemplary dashboard of the virtual platform shown in FIG. 1.

The dashboard 10 may provide at least one interactable element to allow the user access to a map view 11. As shown in FIG. 3, map view 11 is an application layer where a map application may be incorporated into the virtual platform (e.g. Google Maps, Apple Maps, etc). The map may include different property locations associated with the management entity utilizing the virtual platform 2. Within the map view 11, a building view layer 12 is accessible. The building view shows an outer view (i.e. street view) of the building associated to the property location associated with the management entity. Within the building view layer 12, the user may view the area around the building. General building in formation may be displayed such as ownership status, leasing information, local jurisdiction, legal information, property survey information, city permit information. Other building information may be accessed and displayed such as parking, access points. The building view layer 12 may include an option element to export directions to a separate device through a wired or waveguided manner via the network 3.

Layout view layer 13 is a floor plan view of the building accessible within the building view layer 12. Certain floors of the building and specific rooms may be selectable within the layout view layer 13. Information such floor owner or leaser, area function, remodeling information (e.g. what was remodeled and when), and area utilization. Layout view layer 13 may also include HVAC system layout, gas lines, water lines, and waste lines. The floor plan may be developed from blueprints of the building or provided as an as-built model. The floor plans may include 3-dimensional modeling of the building and/or the floor space which may be recreated, captured or scanned via known three (3) dimensional model construction software such as Matterport, Reconstruct, Dalux, Prevu3D, SiteScape, PolyCam or other known reconstruction software capable of mapping 3D space.

Space view layer 14 may be accessed within the layout view 13. The space view layer 14 is a more detailed view of the layout view layer 13. The space view layer 14 allows the user to view assets. Assets may be broken down into non-fixed assets (e.g. furniture, appliance, equipment, electronics, etc.) and fixed assets which may also include the property itself or portions of the property (e.g. floors, ceilings, walls, HVAC system, lighting fixtures, etc.). Thus, as used herein, assets are all objects that is the responsibility of the management of the property. The space view layer 14 allows the user to navigate throughout the floor or building. The user may virtually "walk" through the recreated 3-dimensional space of the building or floor. The space view layer 14 allows the user to accurately measure distances or objects with high accuracy without being present. The space view may also allow the users to view different sections of the walls or ceiling in order to view the building construction or structure (e.g. turn off walls or turn off ceiling). Assets may also be interactable. Choosing or interacting with an asset in the space view layer 14 may provide the user with property details via an asset graphical interface. The asset graphical interface may include drive to options and other analytical information such as real estate, facilities, usage of space, approvals, etc. The asset graphical interface may also include information such as scheduled maintenance or preventative maintenance. In addition, the assets can be tied into the Building Automation System, Security System, and other factors to potential track asset/equipment performance function. Each asset may correspond to its own interactable asset graphical interface.

The asset graphical interface may include different selectable/interactable elements and interactable options depending on the selected asset. A selection of the floor of the property provides different options compared to selection of an appliance (e.g. refrigerator). For example, work orders placed via the asset graphical interface for a floor may include cleaning or remodeling, while the appliance may include finding a replacement or initiating a repair work order. The asset graphical interface may also be incorporated with differing elements or options based on input data from other software or programs. The virtual platform 2 may communicate with different software such as accounting software. For example, the virtual software may be configured to input and/or output costs related to work orders or actions executed in the virtual platform 2.

For management of facilities, the virtual platform 2 may provide options for work orders such as replace, repair, remove, maintenance work, inspections, adjustments or any other action required to be performed on the asset. For certain equipment, products, or furniture. The asset graphical interface may display asset information of the asset such as operation and maintenance models, pricing, time of last workorder, past work order history, cost history, leasing terms, or any other information associated with the asset. This asset information may also be pre-populated by automatic import from one of the external databases **4*b*** of the associated manufacturer or supplier. The cost and respective area allocation (e.g. performance metrics at a specific location) may also be displayed. The asset graphical interface may also include 3-dimensional models or pictures of different sides of the asset in order to inspect and/or export to other systems. The asset graphical interface may also include market price of the asset. This market price information may be imported and provided from an external market system (e.g. Ebay, Amazon, etc.) or directly from the supplier or vendor. The asset graphical interface may also include work order costs imported and provided from systems of contractors or workorder service providers. Pending work orders may also be shown in the asset graphical interface. Information such as requested work orders, accepted work orders, date of work order and date of work may be provided in the asset graphical interface by the electronic device. Notifications may also be sent to selected devices to notify when deliveries have arrived if a delivery has been processed. Additional information such as install date may also be provided in the interface.

Ongoing or planned projects may also be shown by the associated asset of the project. Plans for the project may be displayed and on the asset graphical interface and may include information such as project status, timelines, costs, and other information in order to track the project progress.

The communication between the virtual platform 2 and external systems such as the external market system, contractor systems, electronic devices 5, database **4*a* and 4*b*** may be communicated via API through the internet or other known wired (e.g Ethernet) or wireless (e.g. Wi-Fi, Bluetooth, Etc.) means.

Different users may be allowed to access and interact with the layers 11-13 depending on the authorization. For example, authorized users of the management entity of the property may be able to access all layers 11-13. Contractors or service providers called by an executed work order may only access portions of the layer (e.g. only the area layer 13), and portions of the layer (e.g. pertinent or private information of the asset in the asset interface) may also be restricted for the contractors. External users (e.g. users outside of management entity) may also be allowed to interact with the layers. For example, the contractor or service provider of the work order may mark the work order as complete, upload updated pictures or new virtual scans, or provide invoices to the virtual platform via the asset graphical interface. Other files may be uploaded such as documents or hyperlinks in order for other users or electronic devices to access.

Corporate view layer 15 is only accessible to authorized users in the management entity. The corporate view layer may include a master list of assets or inventory, list of contacts such as suppliers, vendors, or contractors, and required maintenance list which may also be incorporated into the master list of assets and inventory.

A virtual reality system may be incorporated to the virtual platform such that the space view may be explored via virtual reality headwear. This virtual reality system allows the user to experience and manage the interior of the building remotely. The system can also be used in augmentation reality experiences.

Asset and property management may be integrated and optimized using artificial intelligence system. The artificial intelligence (AI) system disclosed herein may include machine learning algorithms or neural networks in order to automate decision making for the management entity and users of the virtual platform. The AI system may map any space into virtual reality model with an ability to automatically tag any objects in the model based on general dimension, depth, or branding information on object, which then ties into the corporate database assessing key data points and workflow function. The AI system continually learns and adapts the data and thereby proactively recognizes objects, trends on functional issues, cost tracking trends, and helps guide the users for the necessary operation including performing purchase orders directly without the manual intervention by a user. The AI system may utilize different software in order to execute the actions calculated and recommended by the system. With extensive visual and predictive analytics, the platform provides inherent decision-making capabilities for users at various levels of the management entity. The AI system may also predict future issues for managed assets from trend on work order action tied to the specific asset. For example, the AI system may predict when the asset or parts of the asset will require maintenance or is likely to break down and require repair. This information regarding the need for service provides business intelligence on overall asset operation as it relates to function and results, thus allowing management entities to make analytical decisions on performance of its assets over numerous locations. AI system may be incorporated by machine learning algorithms or neural networks provided in the network 3 and/or database 4*a*.

Figure 4:
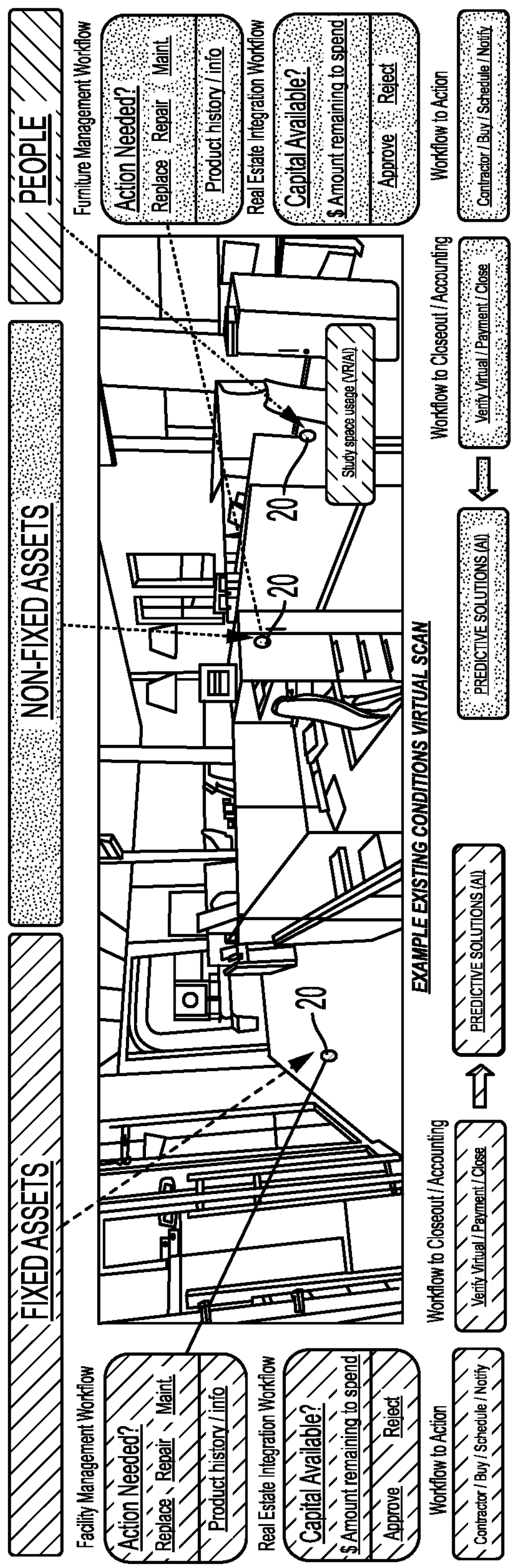
FIG. 4 is an exemplary space view layer.

FIG. 4 is an exemplary space view layer 13 of the virtual platform 2. The space view 13 includes space view interactable elements 20. Interactable elements is any clickable or selectable part of the virtual platform 2.

Figure 5:
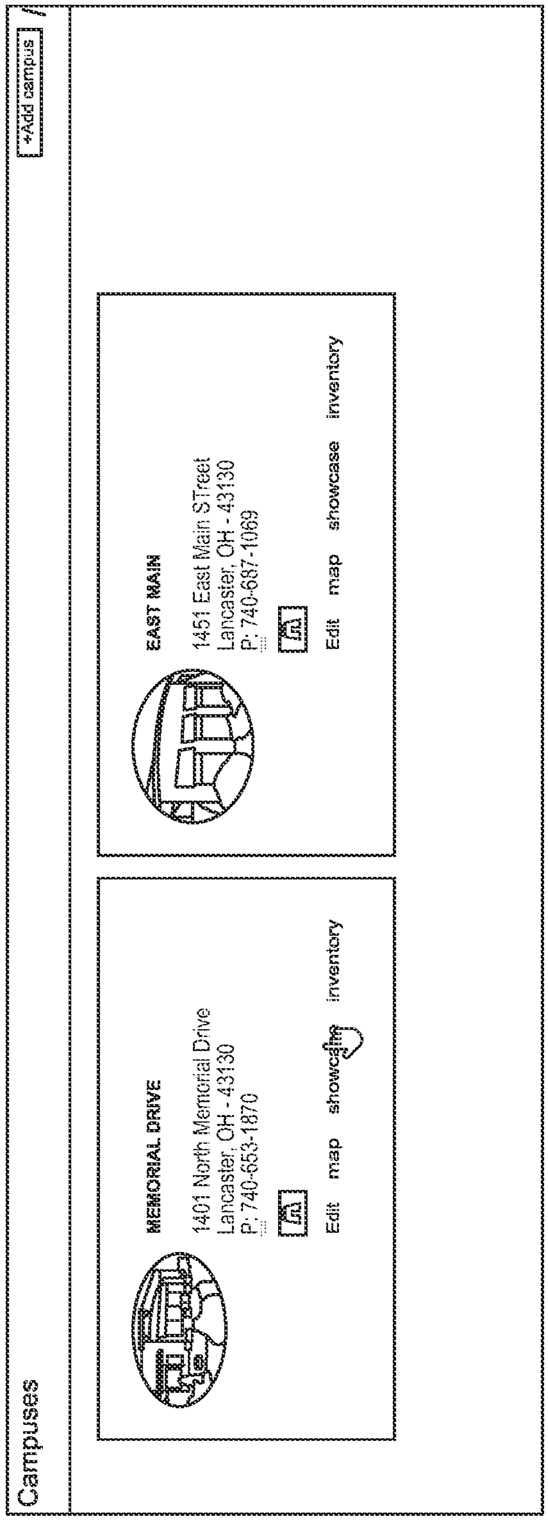
FIG. 5 is an exemplary portion of a dashboard.

FIG. 5 is an example portion of a dash board 10. The figure shows selectable elements 10*a* for different locations of property managed by a management entity.

Figure 6:
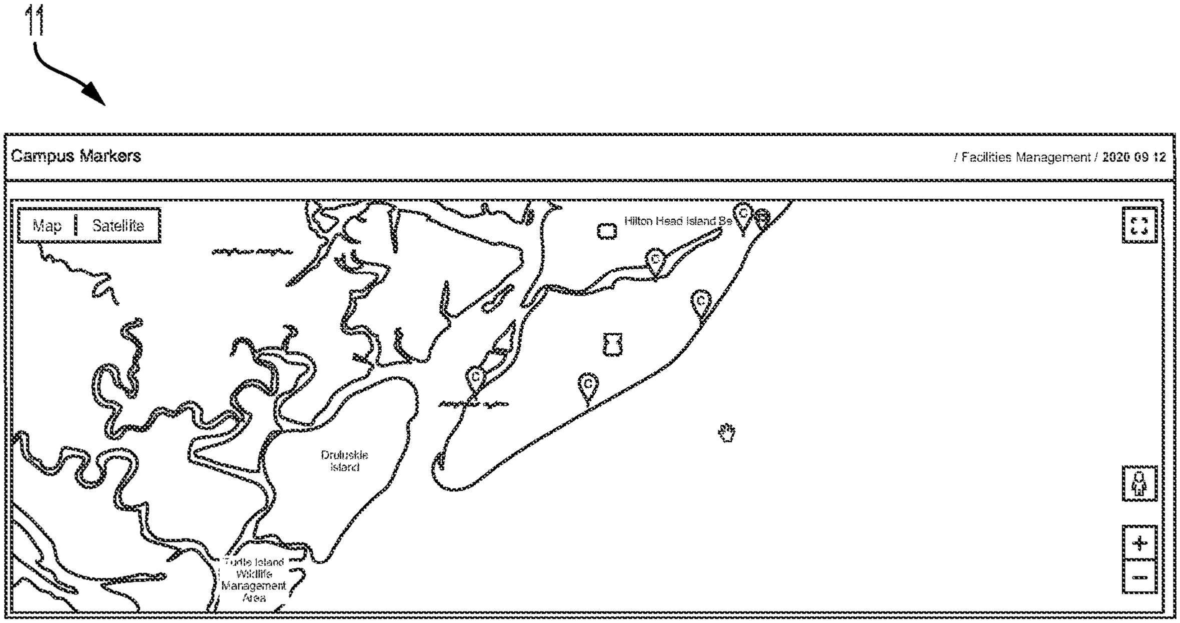
FIG. 6 is an exemplary map view layer.

FIG. 6 is an example map view layer 11 showing different locations of the managed property.

Figure 7:
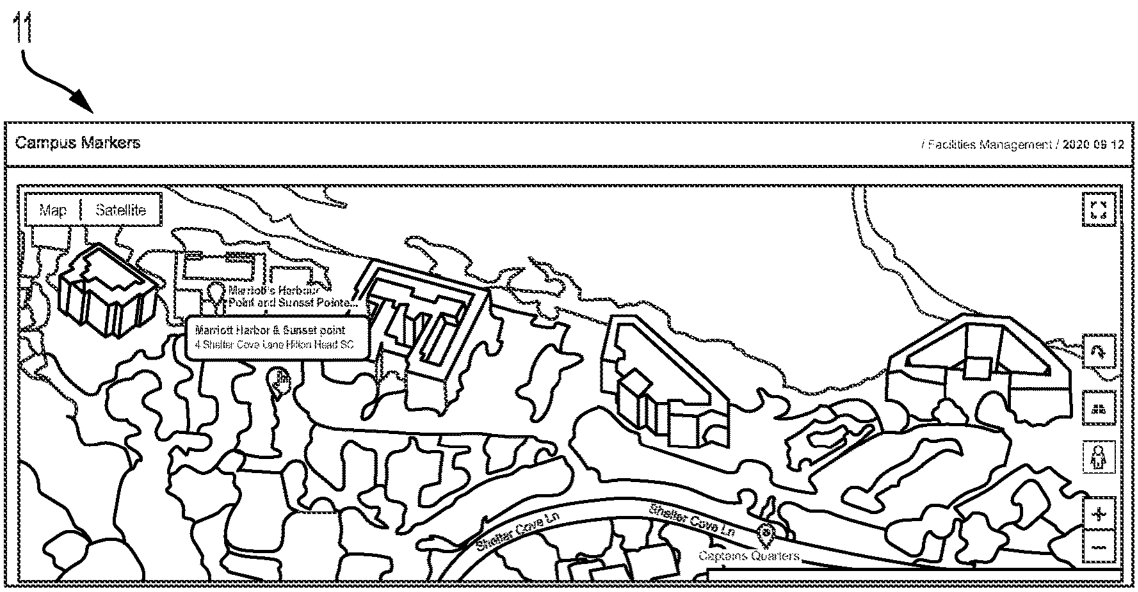
FIG. 7 is an exemplary map view layer.

FIG. 7 is another exemplary map view layer showing a specific location of the managed property.

Figure 8:
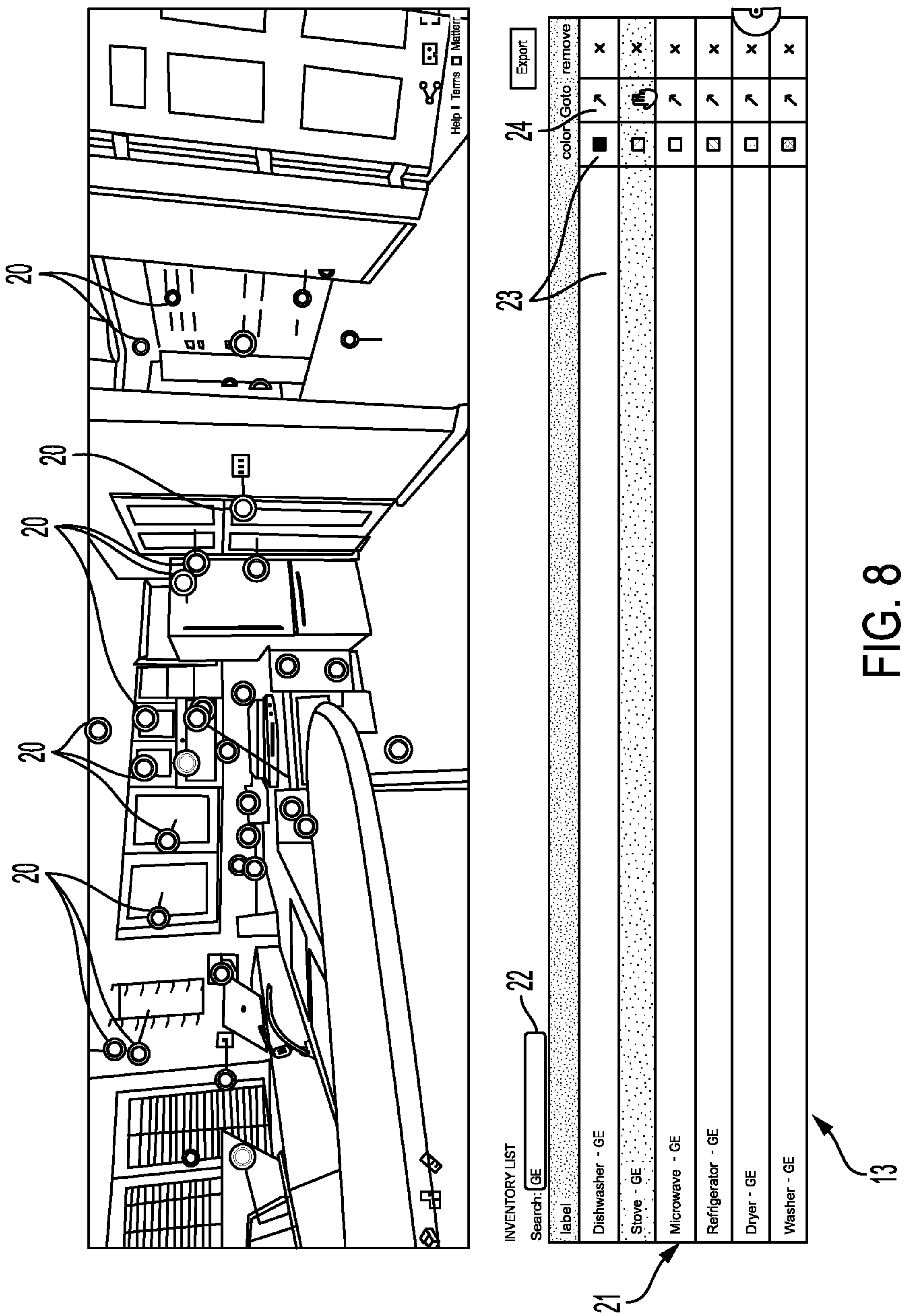
FIG. 8 is an exemplary space view layer.

FIG. 8 is an exemplary view of a space view layer 13 showing a specific area of a property with space view interactable elements 20 representing different assets (not all elements 20 are labeled for clarity). This space view layer includes an inventory list 21 with a search box element 22, allowing the user to search for assets within the space view layer 13. The inventory list may include one or more information element 23. The inventory list 21 may include shortcut elements 24 configured to take the user to the associated asset linked to the shortcut element 24.

Figure 9:
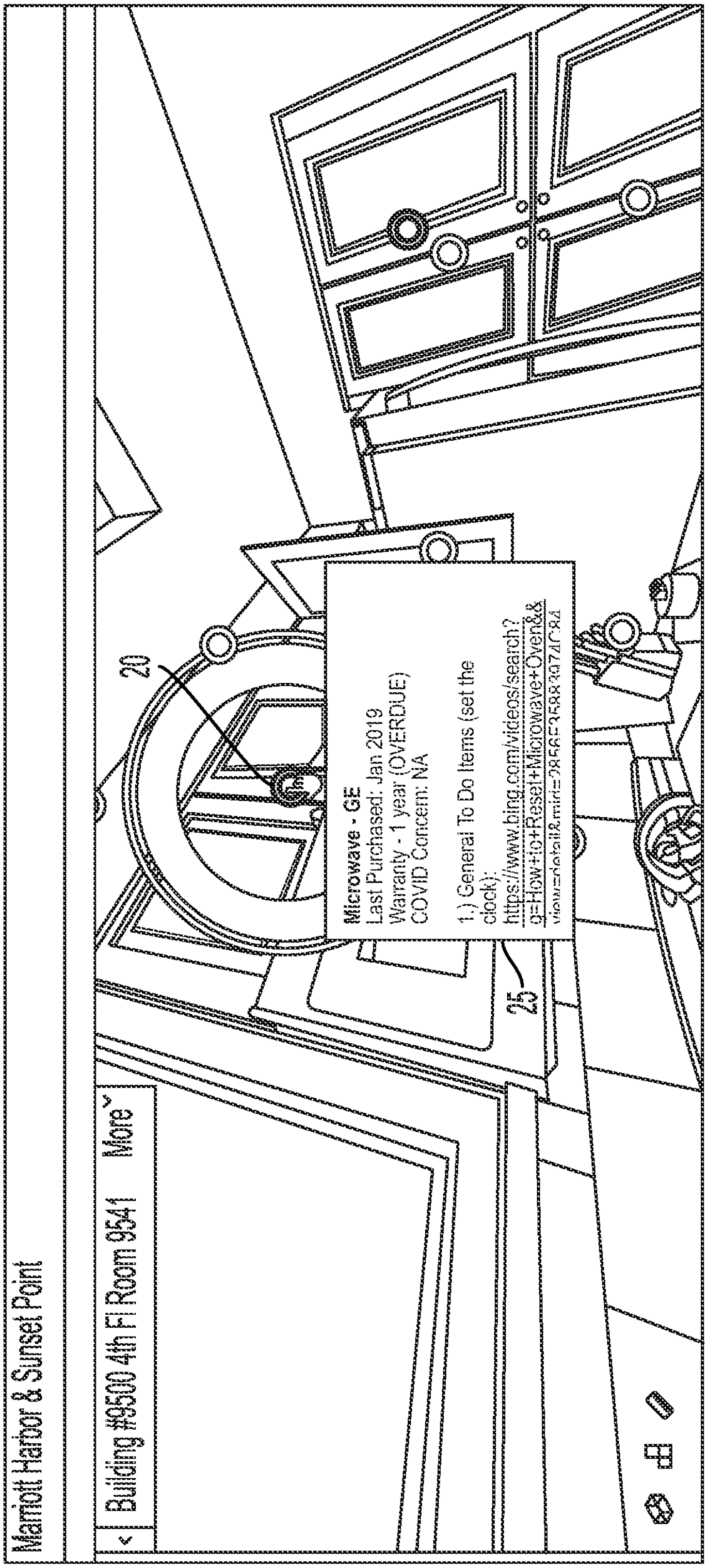
FIG. 9 is an exemplary space view layer.

FIG. 9 is an exemplary view of a space view layer showing a close up of an asset. Interacting with the element 20 opens an asset graphical interface 25. In this example, the asset graphical interface 25 of an exemplary microwave asset includes information such as purchase date, warranty information, and notes. These notes can include interactable hyperlinks and miscellaneous notes to be shared with other users of electronic devices 5. Videos and external links may be browsed within the virtual platform.

Figure 10:
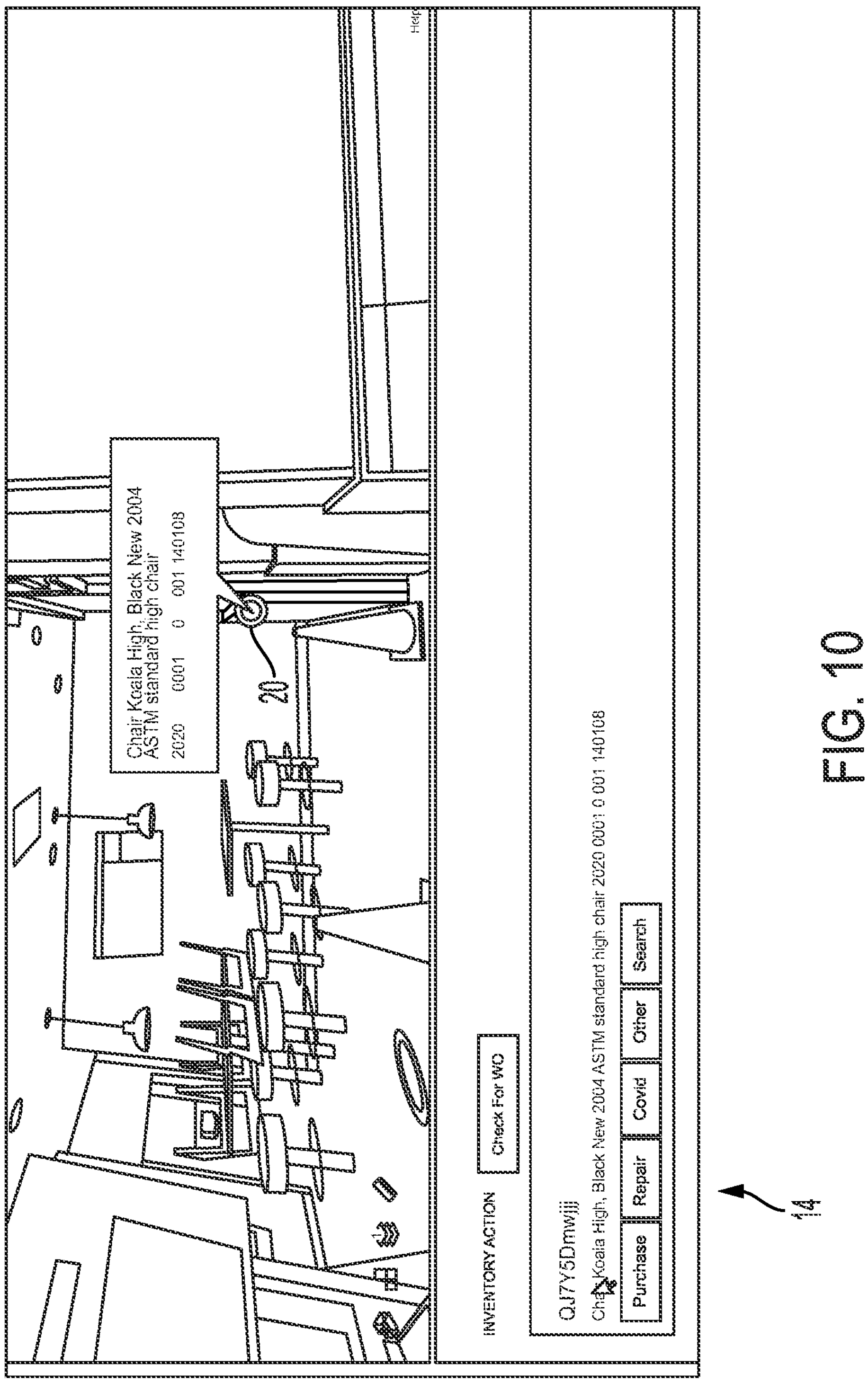
FIG. 10 is an exemplary space view layer.

FIG. 10 is another exemplary view of a space view layer 14 of another exemplary property. In the space view layer 14, the space view interactable element 20 may be shown with an asset graphical interface showing general asset information regarding the item and other interactable elements such as work order status checks, purchasing the item, repairing the item, etc.

Figure 11:
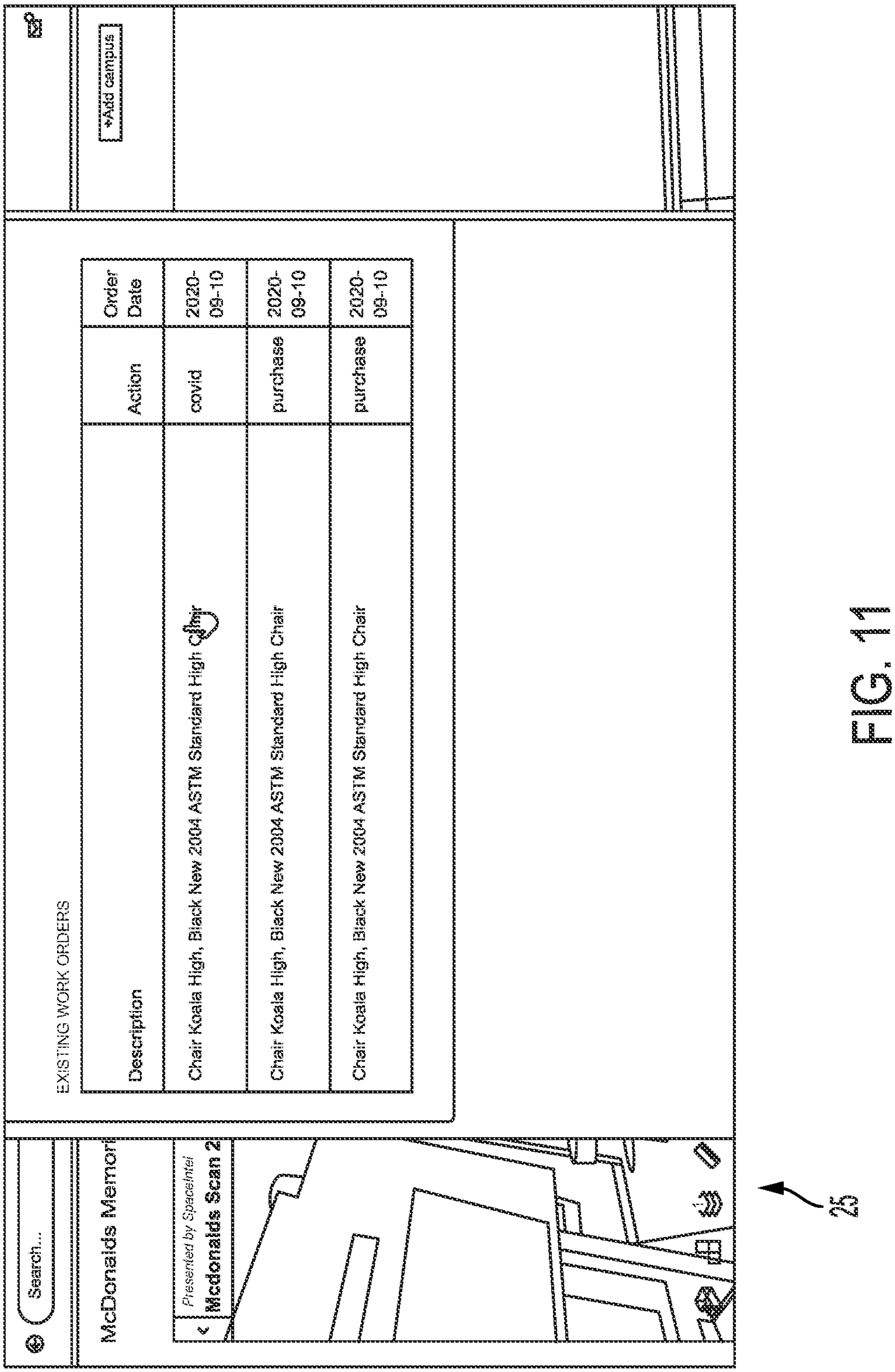
FIG. 11 is an exemplary asset graphical interface.

Choosing the work order status on as shown in FIG. 10 opens the asset graphical interface shown in FIG. 11. The work order status may show existing work orders.

Figure 12:
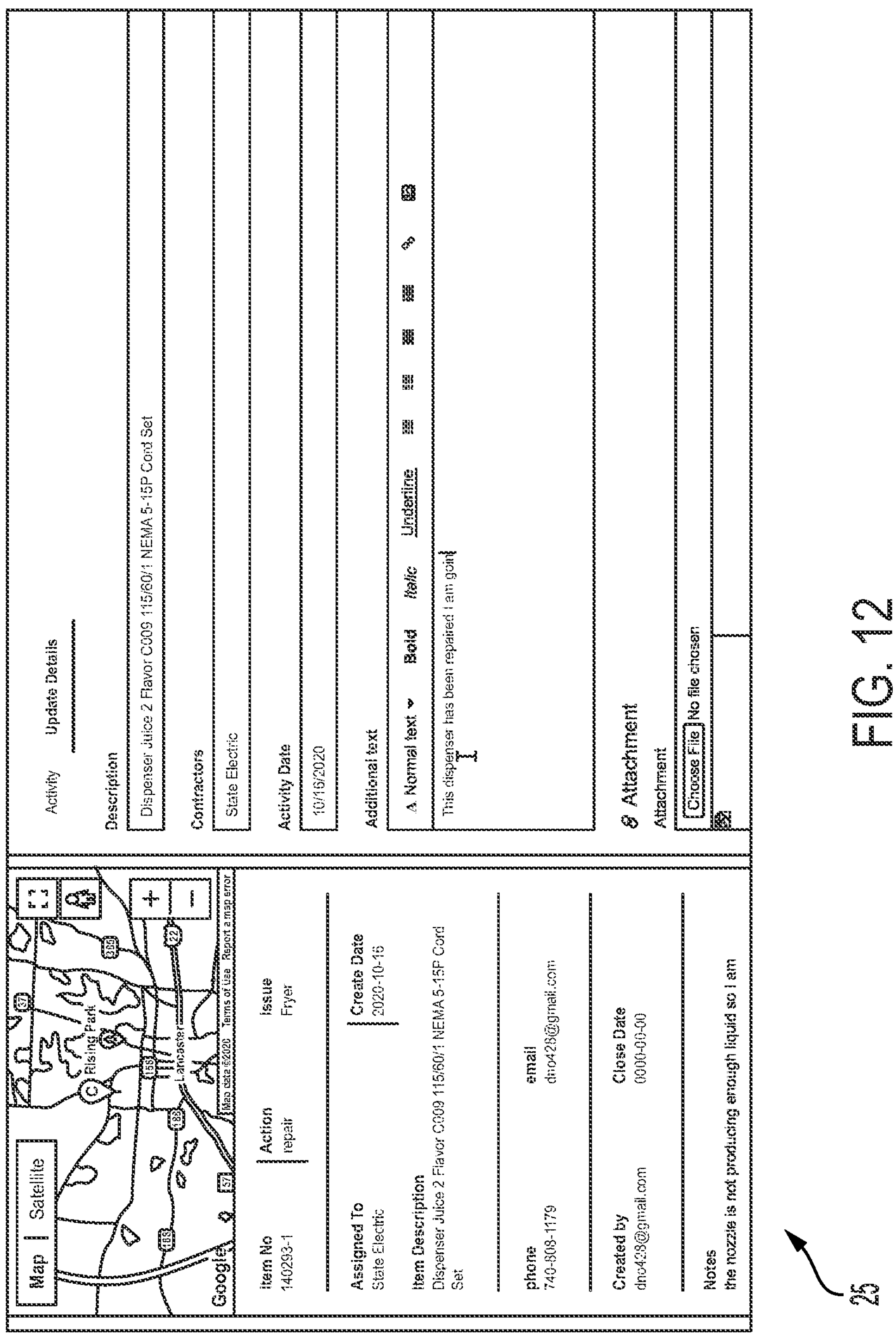
FIG. 12 is an exemplary asset graphical interface.

Choosing a specific work order prompts the opening of the asset graphical interface 25 shown in FIG. 12. This work order opens up the specific details for the corresponding selected work order. The specific work order details may include the description of the work order (e.g. what the work order entails), the associated asset of the work order, the contractor or vendor of the work order, dates (e.g. when work order scheduled time, when the work order was last updated), contact information of the vendor/contractor, and miscellaneous notes which users may enter in order to convey to other users.

Figure 13:
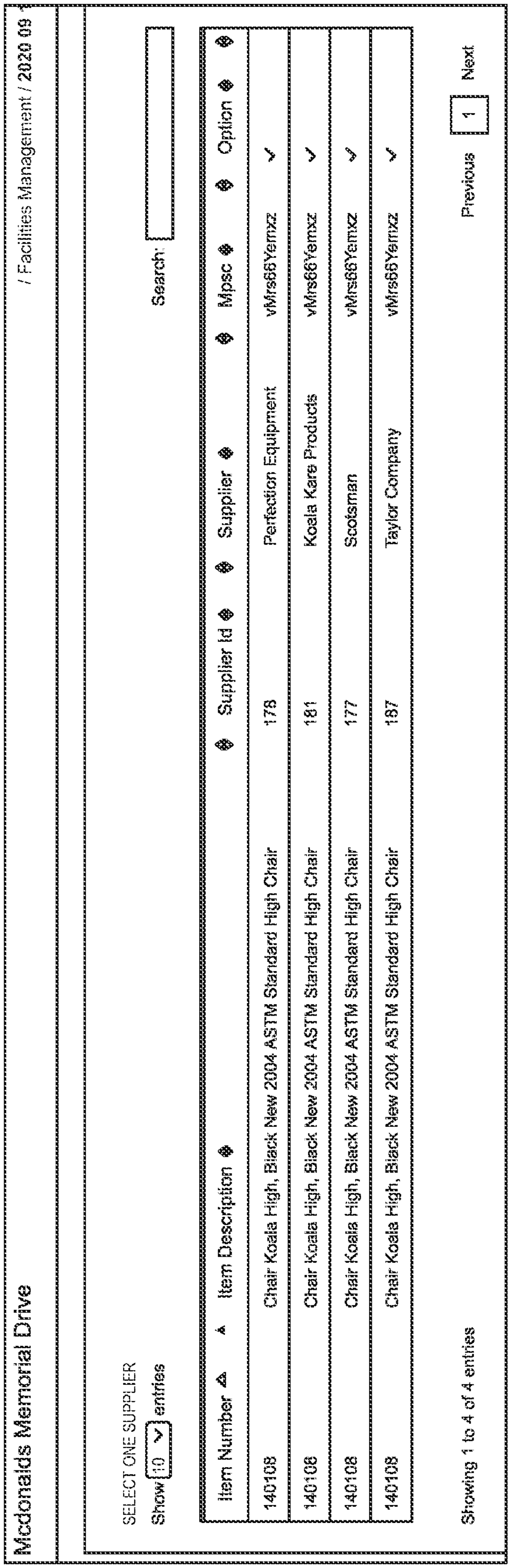
FIG. 13 is an exemplary asset graphical interface.
Figure 14:
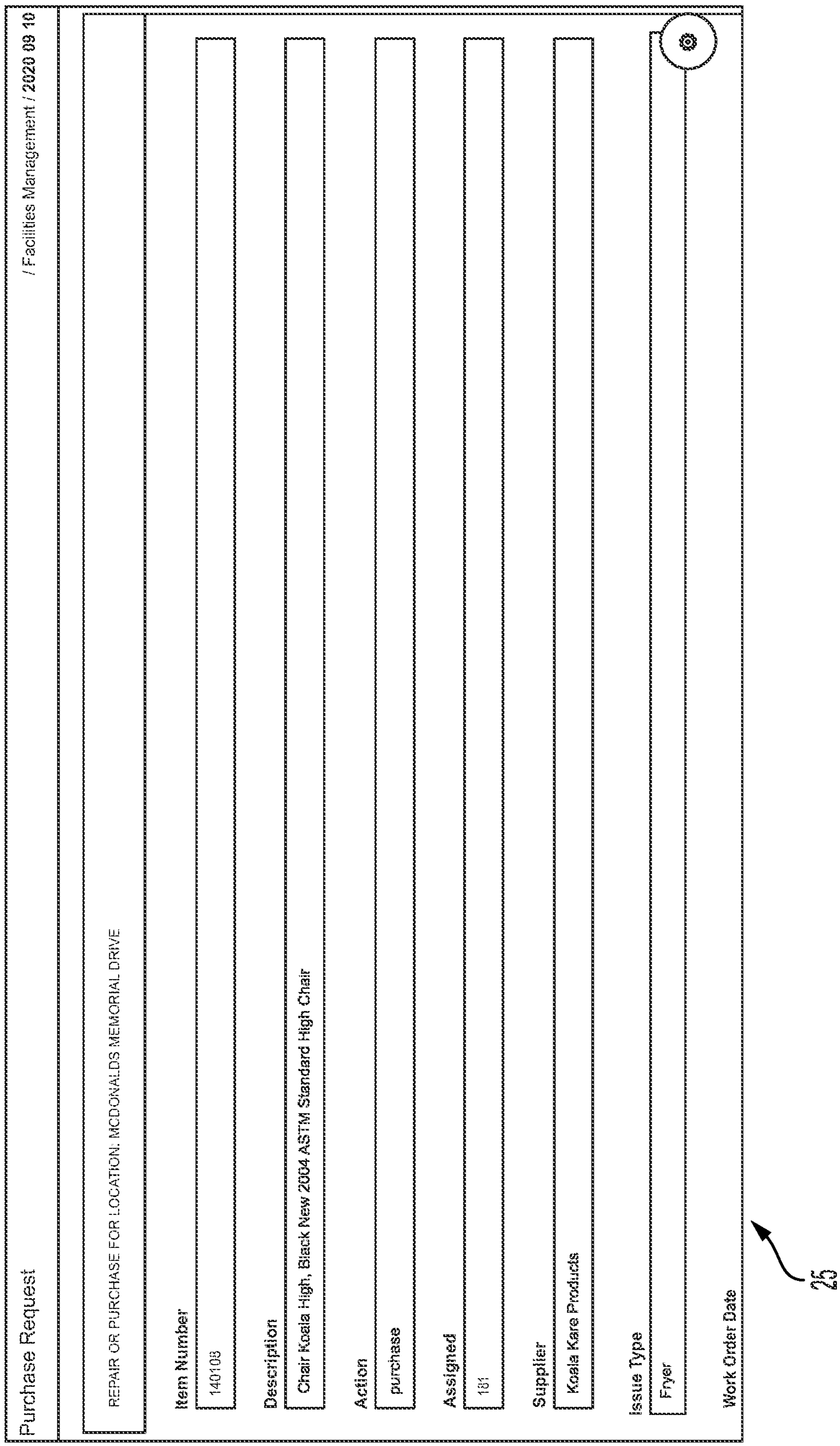
FIG. 14 is an exemplary asset graphical interface.

Choosing the repair order status on as shown in FIG. 10 opens the asset graphical interface shown in FIG. 13. The repair work order for this asset may bring up a vendor list showing different vendors that is capable of supplying the asset wanting to be repaired. After choosing a vendor, the virtual platform may pre-populate information extracted from external database 4*b* associated with the vendor and provide a receipt for the virtual platform to store in database 4*a* and accessed by users of electronic devices 5 utilizing the management system 1 as shown in FIG. 14.

Figure 15A:
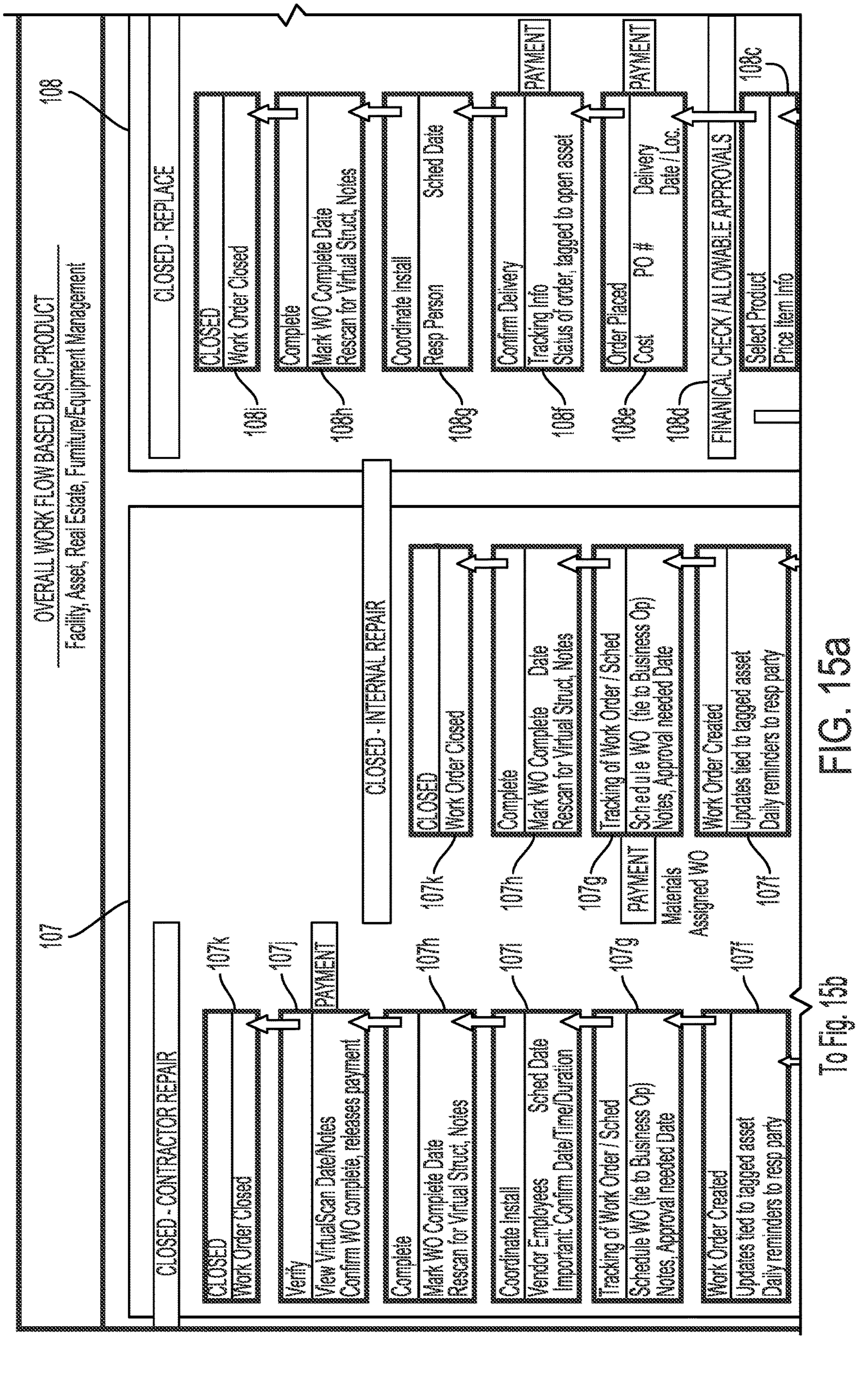
FIG. 15*a* is an exemplary workflow process utilized by the management system of FIG. 1.
Figure 15B:
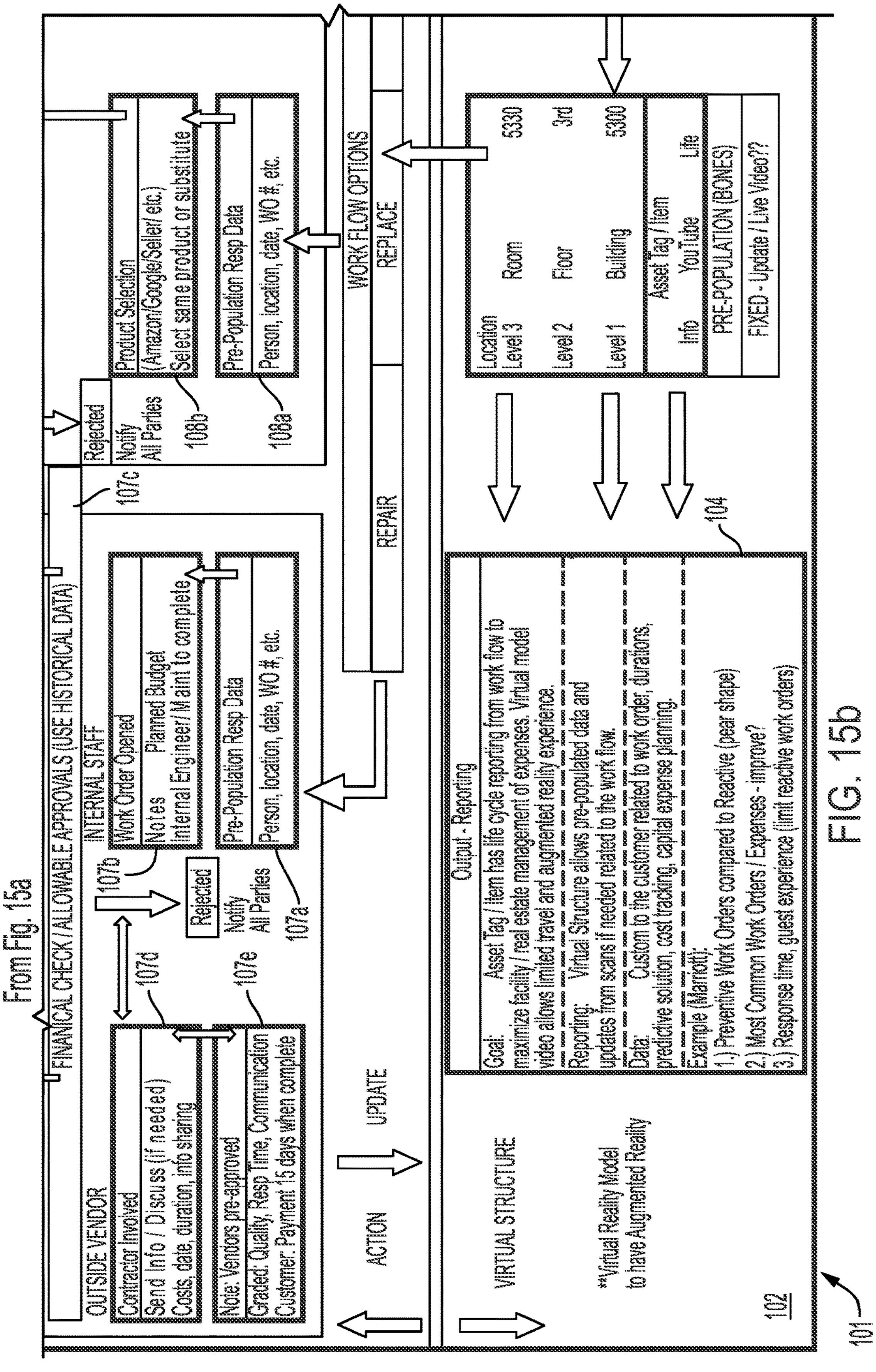
FIG. 15*b* is an exemplary workflow process utilized by the management system of FIG. 1.
Figure 15C:
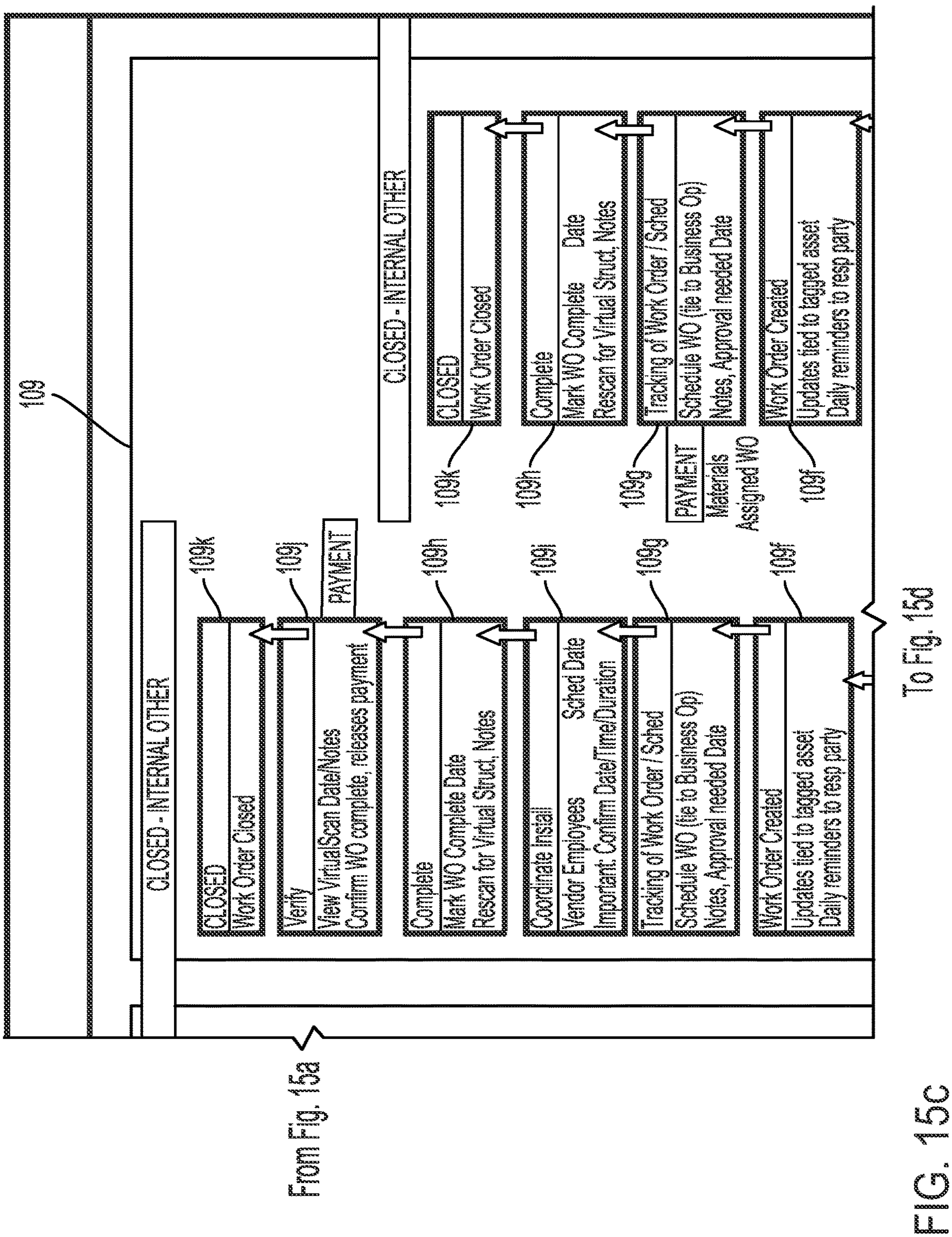
FIG. 15*c* is an exemplary workflow process utilized by the management system of FIG. 1.
Figure 15D:
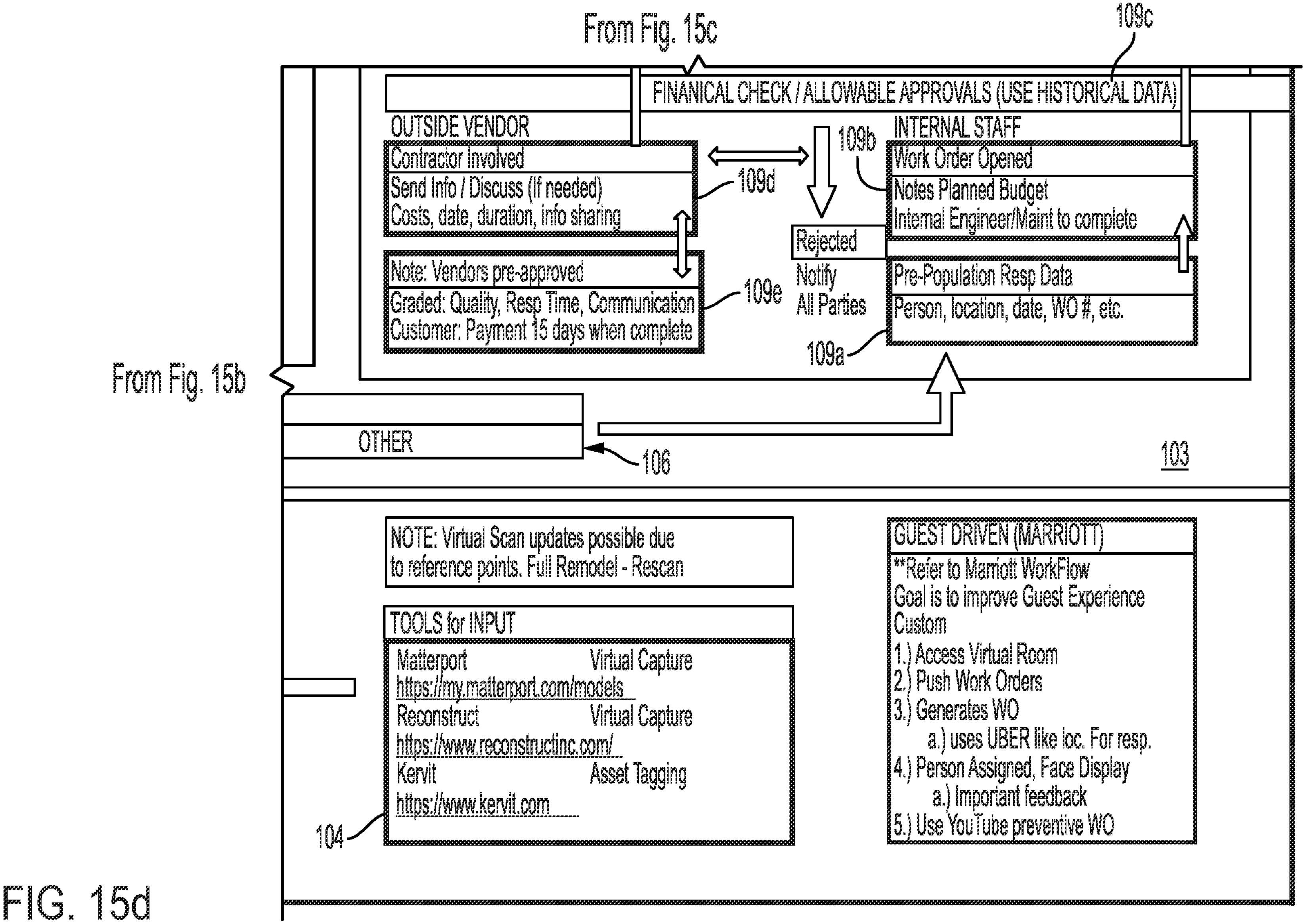
FIG. 15*d* is an exemplary workflow process utilized by the management system of FIG. 1.

FIGS. 15*a*-5*d* shows an overall work flow process 101 utilizing the virtual platform 2 for an exemplary asset. The work flow process 101 takes place in the virtual platform 2 utilizing the described layers 11-14 and its features as described above for FIGS. 1-14.

Workflow process 101 includes a virtual platform application block 102 and process block 103. Virtual platform process block 102 represents the virtual platform 2 and its series of inputs 104, outputs 105, and workorder workflow actions 106. Block 107 shows the work flow for an exemplary "REPAIR" work order. Block 108 shows the work flow for an exemplary "REPLACE" work order. Block 109 shows the work flow for an exemplary miscellaneous/other work orders created by the virtual platform 2.

If a repair work order is placed by the virtual platform 2 from a user 5, the workflow action 106 follows repair block 107. This user may be part of management entity or one or more of the personnel utilizing the property with authorized access to the virtual platform 2. After the repair work order is placed, pre-population data is executed at repair sub-block 107*a*. The next step at repair sub-block 107*b*, a user of the management entity (e.g. management engineer or maintenance personnel) may review and complete the work information. Work order information may include estimated costs in order to perform the work order. The work order information may also be modified depending on outside vendor input at sub-block 107*d*. At sub-block 107*d*, the vendor and/or contractor contacted by the management entity to execute the work order may provide updated cost information and other information such as completion date, duration, or any additional information pertinent to the work order. These work order details may be accessed in the virtual platform 2 via the asset graphical interface associated with the corresponding asset. If the asset has been replaced, the previous asset information may be accessed in the virtual platform. The vendor and/or contractor may utilize the virtual platform 2 as one of the users 5 shown in FIG. 1. At sub-block 107*e* corporations may provide vendors and/or contractors with ratings throughout multiple locations and ensure that useful feedback is given to the vendor and/or contractor. The feedback can be reviewed by the vendor and/or contractor in order to improve operations such as improved cash flow from the resulting high performance. The virtual platform 2 may also geo-locate the nearest vendor and/or contractor based on the location of property where work order is associated with. Once the work order information has been reviewed and updated via exchange with the outside vendor at sub-block 107*d*, the work order may be submitted by the user of the management entity (e.g. management engineer or maintenance personnel). A financial check occurs at financial check block 107*c* after the submission. At the financial check block 107*c*, the virtual platform checks historical data and finance data from the financial database of the management entity (e.g. information found in database 4*a*). If the work order does not pass the financial check, then the work order is rejected and all parties associated with the work order is notified. Financial check may include different criteria such as whether or not the cost of the work order is within estimates or budget, whether or not the work order is timely, or whether or not the work order is essential.

Once the financial check 107*c* has been passed. The work order is officially confirmed and the work order is listed as pending at sub-blocks 107*f* and updates are tied to the corresponding asset of the work order. Work order progress is then be tracked at sub-blocks 107*g* and payment is made to the responsible entity for the work order. At sub-blocks 107*g* the virtual platform also schedules the corresponding work order. At sub-blocks 107*h*, the virtual platform 2 updates the work order as complete once the work order has been completed by the vendor and/or contractor associated with the work order. At this sub-block step, the management system 1 may also provide updates to the layers 11-14 with the new updated work order by providing new 3-dimensional space scans from the input 104 via a virtual 3D capturing systems (e.g. Matterport, Reconstruct, etc.) and automatic asset tagging software, which are assisted by the AI system of the management system 1. Data capturing system 7 may include these 3D capturing systems. These 3D capturing systems may also create a 3D model of the captured space to be utilized in the system described herein. The system described herein may also take data received in from the 3D capturing system in order to provide the 3D model. These virtual capturing and asset tagging system may also be incorporated into the building. These virtual capturing and asset tagging systems may include optical sensors (e.g. cameras) integrated to the building. The asset tagging system provides for easier updates for the virtual space for the layout view layer 13 and space view layers 14. These updates also allow remote virtual verification of the work order in order to confirm the validity and quality of the work order for payment authorization. Other verification methods may include live video confirmation using the virtual capturing and asset tagging system in order to confirm the workorder. The results of input (e.g. output 105) may be received by the virtual platform and the system is updated with the new information received at output 105.

On the contractor or vendor side, after the steps taken in sub-blocks 107*g*, the management system coordinates the schedule of the work order with vendor employees at sub-block 107*i*. The coordination provided by the management system may issue a work order that includes repair dates, labor hours, etc. At this step the vendor or worker may confirm or adjust the parameters of the schedule of the work order. For example, new work order dates may be negotiated and updated to the management system 1 via the virtual platform 2.

After sub-block 107*h*, the vendor or contractor may view the resulting virtual scan of the work order and may either approve or deny depending on the accuracy of the scan at sub-block 107*j*. Once the scan is confirmed by the vendor or contractor, payment is sent to the vendor or contractor and the work order is flagged as closed in sub-block 107*k*.

The steps recited here are also provided for block 109 and similar step sub-blocks 109*a*-109*j* are executed for miscellaneous work orders. Certain steps may be modified or omitted depending on the work order.

For the "REPLACE" work order 108, after pre-population step at sub-block 108*a*, the virtual platform is provided a list of products selected by the management system 1. An authorized user of the management entity may select a product at sub-block 108*c*. Once a product is selected, a financial check is provided at sub-block 108*d*. If denied, the management system 1 notifies all parties involved in the work order. Once the product order is approved, payment is sent at sub-block 108*e* and the order is placed to the corresponding vendor. Once payment is received by the vendor, the delivery tracking is updated to the management system 1 in the virtual platform 2 at block 108*f*. The scheduling of the installation occurs at block 108*g*, where the vendor may provide a scheduled date. Once the installation is complete the management system 1 may also provide updates to the layers 11-13 with the new updated work order by providing new 3-dimensional space scans from the input 104 via virtual capturing systems (e.g. Matterport, Reconstruct, etc.) and automatic asset tagging software, which may be assisted by the AI system of the management system 1 at step 108*h*.

Additional embodiments of the 3D capturing system includes any optical sensors utilizing lidar such as a system with multiple electronics devices with lidar capabilities (e.g. iPhones/iPads, security cameras with lidar, RaspberryPi camera modules) or 360 cameras (e.g. Navvis) utilizing any known photogrammetry software in order to create the 3D model. For assets located on exterior of buildings (e.g., roof mounted equipment, windows, antennas, etc.), cameras mounted on drones may be used to capture images. The drone flights may be controlled remotely and may be undertaken periodically to update the information and images.

The system (e.g., a data capturing system 7) described herein may incorporate automatic tagging software such as any known image recognition software/algorithms (e.g. Google Lens). The system described herein may also allow manual tagging of assets in the 3D model. The system described herein may utilize Simultaneous Localization and Mapping (SLAM) technology. For example, the system may utilize Gradslam, which is a fully differentiable dense SLAM framework. It provides a repository of differentiable building blocks for a dense SLAM system, such as differentiable nonlinear least squares solvers, differentiable ICP (iterative closest point) techniques, differentiable raycasting modules, and differentiable mapping/fusion blocks. The system may use these blocks to construct SLAM systems that allow gradients to flow all the way from the outputs of the system (map, trajectory) to the inputs (raw color/depth images, parameters, calibration, etc.).

The 3D models described herein may be experienced through a VR system via VR headsets or goggles. Interactable elements in the 3D model may be interacted by the user utilizing the VR system.

Figure 16:
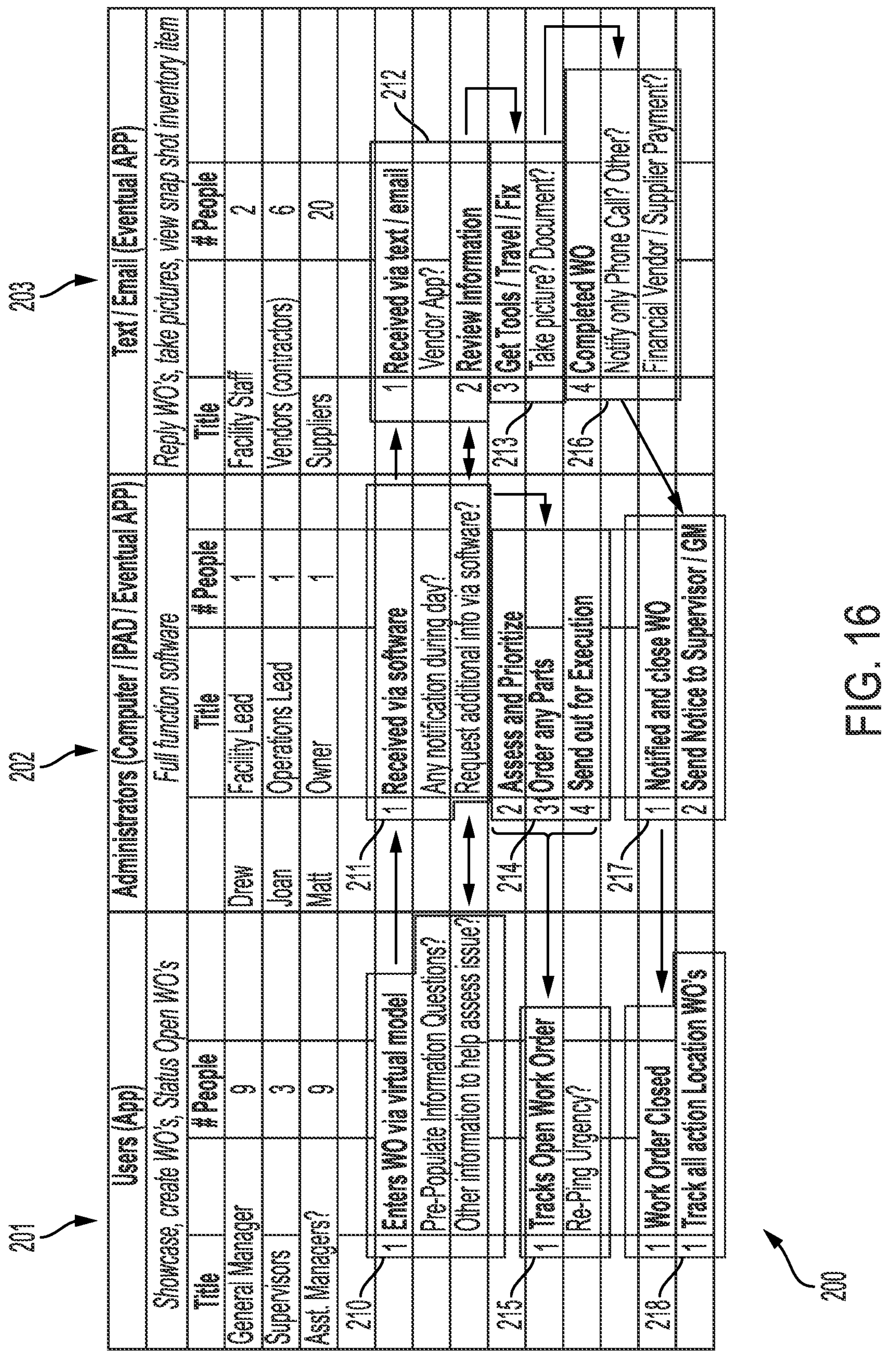
FIG. 16 is an exemplary workflow process utilized by the management system of FIG. 1.

FIG. 16 shows an exemplary communication flowchart 200 between different groups of users. The first set of users 201, for example, are local managing employees which may be general managers supervisors, assistance managers employed in the corresponding property at a specific location. The second set of users 202 may be part of the high tier managing employees (upper management or corporate) of the management entity that oversees different properties at all locations. Third set of users 203 are the baseline users which may include regular property staff, vendors, contractors, or suppliers. Steps 210 to 212 encompass exchange of work orders for clarification and review between all sets of users before it is processed and confirmed at 214 and 213 by the high tier managing employees 202 and vendors/contractors 203 respectively. The virtual platform tracks the work orders at 215 and once the work order is has been executed and finished at 213, step 216 initiates the completion process 217 and 218.

As described further below is a method and system for the management system 1 in order to automatically update the data provided in the layers, namely the layout view layer 13 and zone view layer 14. The management system 1 may provide vector locations of assets within the video embedded in the asset graphical interface 25 or the 3d environment of the space view 14 or layout view 13 via an asset identifier module (i.e. data capturing system 7). The vector location of assets corresponds to a measured distance of the asset in the image, video, or 3d capture at a given frame to the capture point. For every image, frame of video, and/or 3D capture data, the vector location of each asset is identified by the asset identifier module and saved by the management system 1 into the database 4*a*. Upon work order creation, the management system 1, via the asset identifier module, may identify and record these vector location(s) and associate the corresponding vector location(s) to the corresponding work order and to a corresponding asset. The vector location data may be found in the corresponding asset graphical interface of the asset. When a layer update occurs after a work order, (e.g. after recapturing of the area or layout layer via image, video or 3d capturing) the asset identifier module associates the updated image, video, or 3d capture data with the completed work order. The asset identifier module may also update the system with new vectors associated with the asset of the work order if the asset location has been moved. This vector update utilizes other known vectors of other assets identified in the image, video, or 3d capturing process via the asset identifier module. The asset identifier module may be connected to the management system via an API. The asset identifier module may provide automatic updates to a layout view layer 13 or space view layer 14 by associating the work order to an asset based on the vector location of the recaptured image, video, or 3d recapturing. Thus, a post work order update may automatically update the layout view layer 13 and/or space view layer 14 utilizing data capturing system 7 without the need to recapture the whole floor or zone and provides accurate updates to the layout view layer 13 and/or space view layer 14. Alignment of the updated portion in the layout layer 13 and/or space view layer may be assisted with infrared technology.

Another method of updating the layer may include utilizing the original vector location data and image/video/3d capture data of the piece of equipment and performing a side by side comparison to the updated image/video/3d capture data associated with the new updated asset. The asset identifier module may overlay or embed the new image/video/3d capture data as a link within the asset graphical user interface of the asset associated with the work order. The asset graphical user interface may contain the updated location vector data and the location vector data captured at time of work order creation. Users may also access update history of a layer. The layout view layer 13 or space view layer 14 may provide in the asset graphical user interface an interactable interface in order to show all captured images/videos/3d capture data such that the user may look the historical updates and provide side by side comparison of all captured images/videos/3d capture data, including the original image/video/3d capture data. The newly captured image/video/3d capture data can be localized in that the entire layout or zone area does not have to be updated. Instead the users may select parts of the images/videos/3d capture data and replace it with an updated images/videos/3d capture data. Confirmation of the work order may also be done by utilizing the side by side comparison. The asset identifier module may replace the image/videos/3d capture data by the rewriting of data within the image/video/3d capture data.

It is well known that web-based videos contain standardized structures for recording streaming data as well as metadata. These structures are well documented and interpretation of these ISO standards are available and are known in the art.

The management system may also provide a method of finding resources closest to a work order request. At times contractors or suppliers may be needed to respond to work order or equipment requests. The management system may store longitude and latitude of the facility/property location within database 4*a*. This longitude and latitude data is what facilitates map views and such using google maps API functionality. In addition, the management system may receive the ping location of each phone referenced by these contractors and suppliers using geo reference APIs. If a resource has given their approval for the work order, the management system may use these geo coordinates to locate (i.e., a ping) where a given resource is at time of work order creation. Using distance results from these pings would provide the management system 1 with a mechanism to determine the closest resource. Once this distance determination is complete, the management system 1 is able to send a message to the top 3 closest resources and wait for their response (e.g. via text, call, or application response). Once the response has occurred, the management system may update the work order assignment with the resource the phone is associated thereby resulting in autocompletion of acceptance of the request of the work order itself.

The management system 1 may also utilize object detection software such as google vision in order to automate the updating of the layers during the completion of the work order. The method of finding resources closest to a work order request may be performed in a manner broadly similar to the operation of a “vehicle for hire” application. The application operates with relation to the nearest worker to an open item that needs addressing. Predictive solutions may be implemented to facilitate the operation of any functions or methods described herein. Predictive solutions incorporate historical data and provide suggestions or even automated selection of options provided by the system.

The solutions provided by the system described herein improve property maintenance, reduce travel, improve response time, improve communication, and simplify the managing of properties and assets. In addition, the simplified function allows for improved data input and help leaders of corporations improve the life of the property, improve capital expense planning, reduce operational costs, and have a better outlook on real estate growth patterns to help all employees. Lastly, the system provide an overall aggregate of business intel on inventory/asset performance thus making analytical decisions on operating expenses (example—a fast food restaurant or other similar franchised restaurant businesses are able to assess best ice cream performing inventory item based on maintenance costs, repair cost, and production based on a multi-site function (1-1,000 sites for example). Currently items are tracked in general costs by the franchised business. However, the system described herein allows for the breakdown to each called out asset/inventory item. Quick service restaurant business may take advantage of the solutions described herein to maximize cost reduction and profits by reducing capital expenses, increase equipment revenue due to reduction in equipment down time, reduction in maintenance costs. Virtualization of the business helps with communication and information sharing. This virtualization also empowers interaction with the store for employees.

Other industries may also take advantage of the provided solutions described herein, such as hospitality, manufacturing, retail, and banking. In hospitality, occupant experience is key to encourage repeat visits and to build a positive reputation. The solution herein aids in costly operational events so that other issues may be prioritized that focuses on occupant safety and comfort. The solution herein decreases time spent on guest issues, improves integration with property amenities with intelligent tracking for food ordering, which adds value and efficiency. The system described also allows guest viewing of virtual public places, such as workout eras, pools, etc., to provide guests a better experience. Users may access rooms virtually to issue work orders. The system can be utilized by administrative staff (e.g. owners/managers) in order to execute work orders remotely. The system can also be used by customers/guests. The platform described herein and its accompanying virtualization can be embedded within a branded hospitality app in order to allow for the guest to experience increased and branded service. Work orders can range from issuing towel replacement to replacing furniture/appliances. Long term benefits such as improved guest experience allows higher fees thus higher profits. The system also allows data of assets to be analyzed in order to improve operations year over year.

In manufacturing, it is a problem to manage all assets in a single platform for maintenance, repair, and production lines. The current system streamlines asset management in a 3D virtual reality and facilitates the organization of maintenance and training materials while creating/managing predictive and preventative analytics (IoT) to keep manufacturing equipment up and running. The full tracking of multiple assets in multiple locations aids the system in data accumulation and allows the system to access and record multiple data points to the system database to utilize in its predictive and preventive method. The system herein is designed with the manufacturer in mind, problem solving with a focused and practical approach (people, equipment, assets, inventory, production efficiencies). The system provides a proactive program that addresses the business' needs before they occur and reduce downtime on production lines. The other benefits include: Improved equipment and system reliability, reduction of unexpected breakdowns, enhanced production, increase in quality of manufactured materials, improved employee morale due to high performing operations, overall increase in company's profitability, extended equipment life, improved resale value, decrease in unusable material (scrap), and reduced parts replacement costs.

The management system disclosed herein includes an improved functional workflow with virtualization incorporated therein. The system allows easier information gathering and entry of facilities in relation to real estate, equipment management, facility management, asset management, and space management. The management system allows users to see any connected property virtually, track all proper metrics defined by the corporation, and create action items. The system provides a virtual environment of the property with functional data tracking accessible from a remote location from creation of the action item, communication during, or adjustments to the action until closed. The management system allows users to have a simple interface to simplify communications. Authorized users may also assess a vast amount of specific information such as past work orders, or notes on corresponding assets across different properties the users are authorized to access. The management system allows an efficient process for work orders which can notify corresponding users on the status of the work orders and also allow easier communication between parties which can be used to share information between the vendor/contractor and the management entity or other users.

The management system also allows data tracking due to the amount of information tracked and stored in the system regarding assets and property. The system allows for automation of maintenance such as automatic work orders triggered by sensors monitoring the assets, automation of tracking via scanning of the building and creating a 3-dimensional space that may be indexed and searchable via an easy to use graphical interface. Employee personnel of a given business may also be tracking by sending GPS data to the management system.

Data stored, exported, or imported by the management system regarding the assets or property may be tracked and utilized by the AI system in order for the machine learning algorithm or neural network to learn and provide future predictions for automatic executions or suggestions of work orders, suggestions of alternative product replacements, and any other improvement of management system that can be provided by automation via the AI system in order to eliminate human errors. The management system also allows easier tracking of business operation and provides opportunities for building and testing of business models utilizing the vast amount of data tracked and stored by the management system. The business intel the system provides allows management entities to maximize equipment performance and reduce resources required. The method and system described above may also be executed by the AI system automatically (e.g. putting in a work order).

The term tagging herein is the process of identifying one or more assets and providing asset information associated with the corresponding asset. For example, a database of information may be associated with a tagged asset. The database may include, for example, part numbers, maintenance record, location, service providers, inventory, etc.

The solution described herein combines virtual reality, interactivity, and predictive analytics to deliver a better and more efficient facility management experience. This solution unifies existing data and work order management processes in an interactive 3D visual format that is predictive, easy to use, and required limited management and resources from the customer. This platform allows remote management and extends ownership to staff members on site.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the management system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

Certain embodiments are described herein as including modules, electronic devices, databases, and networks. These may constitute either software (e.g., code embodied on a machine-readable medium or in a transmission signal) and/or hardware and/or any combination of hardware/software systems. Hardware may be a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as hardware that operates to perform certain operations as described herein.

In various embodiments, hardware may be implemented mechanically or electronically. For example, hardware may comprise dedicated circuitry or logic that is permanently configured (e.g., as a special-purpose processor, such as a field programmable gate array (FPGA) or an application-specific integrated circuit (ASIC)) to perform certain operations. Hardware may also comprise programmable logic or circuitry (e.g., as encompassed within a general-purpose processor or other programmable processor) that is temporarily configured by software to perform certain operations. It will be appreciated that the decision to implement hardware mechanically, in dedicated and permanently configured circuitry, or in temporarily configured circuitry (e.g., configured by software) may be driven by cost and time considerations.

Accordingly, the term "hardware" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware are temporarily configured (e.g., programmed), each of the hardware need not be configured or instantiated at any one instance in time. For example, where the hardware comprise a general-purpose processor configured using software, the general-purpose processor may be configured as respective different hardware at different times. Software may accordingly configure a processor, for example, to constitute a particular hardware at one instance of time and to constitute a different hardware at a different instance of time.

Hardware may provide information to, and receive information from, other hardware. Accordingly, the described hardware may be regarded as being communicatively coupled. Where multiple of such hardware exist contemporaneously, communications may be achieved through signal transmission (e.g., over appropriate circuits and buses) that connect the hardware. In embodiments in which multiple hardware are configured or instantiated at different times, communications between such hardware may be achieved, for example, through the storage and retrieval of information in memory structures to which the multiple hardware have access. For example, one hardware may perform an operation, and store the output of that operation in a memory device to which the is communicatively coupled. A further hardware may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors, as described above, that are temporarily configured (e.g., by software) or permanently configured to perform the relevant operations. Whether temporarily or permanently configured, such processors may constitute processor-implemented modules, electronic devices, databases, and networks that operate to perform one or more operations or functions. The modules, electronic devices, databases, and/or networks referred to herein may, in some example embodiments, comprise processor-implemented modules, electronic devices, databases, and/or networks.

Similarly, the system and methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Network connections as shown as dashed lines in the figures may include channels for the transmission of data may include storage media of all descriptions as well as signal-carrying media, such as wired or wireless signal-carrying media. Software may accompany all recited modules, electronic devices, databases, and networks described above as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

It will be clear to one skilled in the art that many improvements and modifications can be made to the foregoing exemplary embodiment without departing from the scope of the present invention.

What is claimed is:

1. A management system for a plurality of assets located on a property, the management system comprising:
- a network;
- a virtual platform hosted on the network;
- wherein the network includes at least one processor;
- wherein the network is configured to accept a plurality of remote users connected to the network via a plurality of electronic devices;
- wherein the plurality of electronic devices are configured to communicate with the virtual platform;
- the virtual platform comprising:
  - a plurality of interactable layers, wherein at least one interactable layer is configured to be displayed on at least one of the plurality of electronic devices;
  - wherein the at least one of the plurality of interactable layers includes a three-dimensional (3D) model representation of a region of the property;
  - wherein the 3D model representation includes a plurality of interactable elements;
  - wherein each of the plurality of interactable elements corresponds to one of the plurality of assets;
- wherein the at least one processor is configured to display a graphical interface on the at least one of the electronic devices when one of the plurality of remote users selects one of the plurality of interactable elements, and wherein the graphical interface includes a display of asset information of one of the plurality of assets corresponding to the one intractable element;
- wherein the at least one processor is configured to receive captured data that includes images of the property and the plurality of assets, and wherein the at least one processor reconfigures the data to create the interactable layer.

2. The management system of claim 1, further comprising a data capturing system that is configured to send the captured data to the at least one processor, wherein the data capturing system includes at least one optical sensor;
- wherein the data capturing system is configured to scan the property to send an updated virtual 3D model representation to the virtual platform with at least one updated interactable element replacing one of the plurality of interactable elements and updating the asset information.

3. The management system of claim 2, wherein the virtual platform includes a work order that is initiated via the one user of the plurality of remote users, wherein the work order is initiated within the interactable layer that includes the 3D model representation of the region of the property.

4. The management system of claim 3, wherein the work order is initiated via the one of the plurality of interactable elements associated with the asset of the plurality of assets, and the work order is associated with the asset.

5. The management system of claim 4, wherein the updating of the 3D model representation of the region of the property occurs after the work order is complete.

6. The management system of claim 4, wherein the graphical interface is updated with an updated asset information of the asset of the plurality of assets after the work order has been completed.

7. The management system of claim 6, wherein the asset information includes at least one of the make and model, operation manual, maintenance schedules, price, time of last work order, past work order history, cost history, leasing terms of the asset of the plurality of assets.

8. The management system of claim 7, wherein the updated asset information comprises an updated time of last work order.

9. The management system of claim 2, wherein the plurality of assets are assets associated with at one of a hospitality business, a manufacturing business, a restaurant, and a retail business.

10. The management system of claim 2, wherein the at least one processor is configured to automatically identify and tag assets within the virtual platform.

11. A work order system for a plurality of equipment located in a property, the work order system comprising:
- a network;
- a virtual platform hosted in the network;

wherein the network includes at least one processor;
- wherein the network is configured to communicate to a plurality of remote users connected to the network via a plurality of electronic devices;
- wherein the plurality of electronic devices are configured to communicate with the virtual platform;
- wherein the virtual platform is configured to process a work order, via the at least one processor, of at least one user of the plurality of remote users initiating the work order;
- wherein the work order is received by an external user;
- wherein the platform is configured to update the at least one user with a status of the work order, and wherein the status is updated by the external user;
- a data capturing system configured to update the virtual platform after the completion of the work order, wherein the data capturing system includes one optical sensor;
- the at least one processor configured to receive captured data from the data capturing system;
- wherein the work order is associated with an equipment of the plurality of equipment.

12. The work order system of claim 11, wherein the work order system is configured to locate the external user by searching for a nearest candidate user from a plurality of candidate users via geolocation.

13. The work order system of claim 11, wherein virtual platform includes an associated equipment information corresponding with the equipment of the plurality of equipment.

14. The work order system of claim 11, wherein the update of the virtual platform includes updated equipment information regarding the work order corresponding to the equipment.

15. The work order system of claim 12, wherein the updated equipment information comprises an updated time of last work order.

16. The work order system of claim 11, wherein the plurality of equipment are equipment associated with at one of a hospitality business, a manufacturing business, a restaurant, and a retail business.

17. A management system for machinery located in a manufacturing site, the management system comprising:

a network;

a virtual platform hosted in the network;

wherein the network includes at least one processor;

wherein the network is configured to communicate to a plurality of remote users connected to the network via a plurality of electronic devices;

wherein the plurality of electronic devices are configured to communicate with the virtual platform;

wherein the virtual platform is configured to process a work order, via the at least one processor, of at least one user of the plurality of remote users initiating the work order;

wherein the work order is received by an external user;

wherein the platform is configured to update the at least one user with a status of the work order, and wherein the status is updated by the external user;

a data capturing system configured to update the virtual platform after the completion of the work order, wherein the data capturing system includes one optical sensor;

the at least one processor configured to receive capture data from the data capturing system;

wherein the work order is associated with a manufacturing equipment of the machinery.

18. The system of claim 17, wherein the work order system is configured to locate the external user by searching for a nearest candidate user from a plurality of candidate users via geolocation.

19. The system of claim 17, wherein virtual platform includes an associated machinery information corresponding with the manufacturing equipment of the plurality of machinery.

20. The system of claim 18, wherein the update of the virtual platform includes updated machinery information regarding the work order corresponding to the machinery.

21. The system of claim 20, wherein the updated machinery information comprises an updated time of last work order.

22. The system of claim 17, wherein the machinery comprise manufacturing equipment associated with a manufacturing business.

* * * * *